USOO6544923B1

(12) United States Patent
Ying et al.

(10) Patent No.: US 6,544,923 B1
(45) Date of Patent: Apr. 8, 2003

(54) SURFACE-CONFINED CATALYTIC COMPOSITIONS

(75) Inventors: Jackie Y. Ying, Winchester, MA (US); Christian P. Mehnert, Clinton, NJ (US); John S. Lettow, McLean, VA (US); Dejian Huang, Watertown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/648,928

(22) Filed: Aug. 25, 2000

Related U.S. Application Data

(60) Provisional application No. 60/150,672, filed on Aug. 25, 1999.

(51) Int. Cl.[7] .............................................. B01J 31/00
(52) U.S. Cl. ...................................... 502/159; 502/152
(58) Field of Search .................................. 502/152, 159

(56) References Cited

U.S. PATENT DOCUMENTS

| 4,937,218 A | * | 6/1990 | Ramirez De Aqudelo et al. .......................... 502/152 |
| 5,139,985 A | * | 8/1992 | Barbe et al. ................ 502/159 |
| 5,145,816 A | | 9/1992 | Beck et al. |
| 5,200,058 A | | 4/1993 | Beck et al. |
| 5,244,857 A | | 9/1993 | Pugin et al. |
| 5,252,751 A | | 10/1993 | Pugin et al. |
| 5,645,891 A | | 7/1997 | Liu et al. |
| 5,712,402 A | | 1/1998 | Pinnavaia et al. |
| 5,736,480 A | | 4/1998 | Davis et al. |
| 5,795,559 A | | 8/1998 | Pinnavaia et al. |
| 5,800,799 A | | 9/1998 | Pinnavaia et al. |

(List continued on next page.)

FOREIGN PATENT DOCUMENTS

| EP | 0 831 059 A1 | 3/1998 |
| EP | 0 865 823 A1 | 9/1998 |
| WO | WO 98/17389 | 4/1998 |
| WO | 98/17389 A1 | 4/1998 |
| WO | WO 98/46353 | 10/1998 |

OTHER PUBLICATIONS

R. Noyori and T. Ohkuma, "Asymmetric Catalysis by Architectural and Functional Molecular Engineering: Practical Chemo—and Stereoselective Hydrogenation of Ketones," Angew. Chem. Int. Ed, 2001, vol. 40, pp. 40–73.

Ekkehard Lindner et al., "Chemistry in Interphases—A New Approach to Organometallic Syntheses and Catalysis" Angew. Chem. Int. Ed. 1999, 38, 2154–2174.

(List continued on next page.)

Primary Examiner—Mark L. Bell
Assistant Examiner—J. Pasterczyk
(74) Attorney, Agent, or Firm—Wolf, Greenfield & Sacks, P.C.

(57) ABSTRACT

The present invention provides a novel catalytic system comprising catalysts immobilized on ultra-large mesoporous compositions, and particularly compositions having a large percentage of pores with a mean diameter of at least about 50 Å. Catalysts, such as organometallic complexes can reside in these pores to effect catalytic reactions. Such compositions include silicates covalently bound to a ligand that in turn can covalently bind an organometallic fragment. For asymmetric organometallic catalysts, the catalyst is bound to the mesoporous composition via an achiral ligand. The catalytic reactions include hydrogenation, hydroformylation, carbonylation and carbon-carbon coupling reactions, such as Heck or Suzuki reactions. The present invention provides catalyst for performing asymmetric reactions to achieve products of high stereoselectivities. The present invention also relates to ionically immobilized catalysts. In addition, the large pore sizes of these compositions can be used for polymerization reactions where the pore sizes can be tuned to achieve a particular molecular weight distribution. Other uses of the porous compositions include support materials for combinatorial chemistry.

46 Claims, 14 Drawing Sheets

U.S. PATENT DOCUMENTS

| | | | |
|---|---|---|---|
| 5,824,622 A | * | 10/1998 | Harmer et al. ............... 502/159 |
| 5,932,511 A | * | 8/1999 | Harmer et al. ............... 502/152 |
| 5,935,897 A | * | 8/1999 | Trubenbach et al. ........ 502/159 |
| 5,935,898 A | * | 8/1999 | Trubenbach et al. ........ 502/159 |
| 5,951,962 A | | 9/1999 | Müller et al. |
| 5,990,318 A | | 11/1999 | Chan et al. |
| 5,997,840 A | | 12/1999 | Van Brussel et al. |
| 6,028,025 A | | 2/2000 | Ying et al. |

OTHER PUBLICATIONS

C.T. Kresge et al., "Ordered mesophorous molecular sieves synthesized by a liquid–crystal template mechanism" Nature, vol. 359, Oct. 22, 1992, pp. 710–712.

B. Pugin and M. Muller, "Enantioselective Metal Complex Catalysis Immobilized on Inorganic Supports Via Carbamate Links" Heterogeneous Catalysts and Fine Chemicals III, 1993 Elsevier Science Publishers, pp. 107–114.

D. Zhao et al., "Triblock Copolymer Syntheses of Mesoporous Silica with Periodic 50 to 300 Angstrom Pores" Science, vol. 279, Jan. 23, 1998, pp. 548–552.

P. Schmidt–Winkel et al., "Microemulsion Templating of Siliceous Mesostructured Cellular Foams with Well–Defined Ultralarge Mesophores" Chemistry of Materials, vol. 12, No. 3, pp. 686–696, 2000.

J. Ying, "Nanostructural Tailoring: Opportunities for Molecular Engineering in Catalysis", AIChE Journal vol. 46, No. 10, Oct. 2000, pp. 1902–1906.

John Lettow et al., "Hexagonal to Mesocellular Foam Phase Transition in Polymer–Templated Mesoporous Silicas" Langmuir 2000, 16, 8291–9295.

Kurt Polborn and Kay Severin, "Molecular imprinting with an organometallic transition state analogue" Chem Commun., 1999 2481–2482.

Ryoji Noyori and Shoehei Hashiguchi, "Asymmetric Transfer Hydrogenation Catalyzed by Chiral Ruthenium Complexes" Acc. Chem Res. 1997, 30, 97–102.

J. A Wiles, et al. "The First Structure Determination of a Possible Internediate in Ruthenium 2,2'–Bis(diphenylphosphino)–1,1'–Binaphthyl . . . " J. Am. Chem. Soc., 1997, 119, 2940–2941.

D. Alonso, et al, "Ru(arene)(amino alcohol)–Catalyzed Transfer Hydrogenation of Ketones: Mechanism and Origin of Enantioselectivity" J. Am. Chem. Soc. 1999, 121, 9580–9588.

M. Yamakawa et al., "The Metal–Ligand Bifunctional Catalysis: A Theoretical Study on the Ruthenium (II)–Catalyzed Hydrogen Transfer Between Alcohols and Carbonyl Compounds" J. Am. Chem. Soc, 2000, 122, 1466–1478.

Akotsi et al, "Versatile Precursor to Ruthenium–bis(phosphine) Hydrogenation Catalysts" Chirality 2000, 12, 514–522.

Abstract—D. Weaver et al., "Palladium–grafted Moseporous Materials for Heck Catalysis" $216^{th}$ American Chemical Society National Meeting, Boston, Aug. 23–27, 1998.

Abstract, C. Mehnert et al., Metal–Grafted Mesoporous Materials for Heterogeneous Catalysis,. $216^{th}$ American Chemical Society National Meeting, Boston, Aug. 23–27, 1998.

Abstract, F. Babonneau et al., "Synthesis and Structural Characterization of Organically–Modified Microporous Silicates", $216^{th}$ American Chemical Society National Meeting, Boston, Aug. 23–27, 1998.

* cited by examiner

US 6,544,923 B1

SURFACE-CONFINED CATALYTIC COMPOSITIONS

RELATED APPLICATIONS

This non-provisional application claims the benefit under Title 35, U.S.C. 119(e) of abandoned U.S. provisional application Ser. No. 60/150,672, filed Aug. 25, 1999, entitled "Surface-Confined Catalytic Compositions" by Jackie Y. Ying et al., incorporated herein by reference.

FIELD OF INVENTION

The present invention relates to novel ultra-large porous compositions, and organometallic catalysts immobilized on these compositions, including asymmetric organometallic catalysts. Reactions performed by these catalysts include hydrogenation, hydroformylation, carbonylation, carbon-carbon coupling reactions, as well as asymmetric reactions such as asymmetric hydrogenation.

BACKGROUND OF THE INVENTION

Many industrially important reactions, especially in the fine chemicals and pharmaceuticals industries, involve the use of expensive homogeneous catalysts. The homogeneous catalysts show good activity and can be tailored to allow for a high degree of product selectivity.

Such active and selective homogeneous catalysts are expensive to synthesize, and typically are very difficult to recover from reaction mixtures. The complexity of catalyst synthesis and separation procedures leads to high costs due to capital investment in high-temperature distillation and/or liquid-liquid separation equipment used in the separation of the catalyst from the reaction mixture, and due to operating costs incurred by rapid catalyst loss and deactivation. Overcoming or decreasing these obstacles is necessary to meet growing demand for highly specific molecular products, especially in life sciences industries. This demand has driven the commercial desirability of organometallic catalysts for reactions involving carbon-carbon bond formation (e.g., Heck and Suzuki coupling) and enantioselective hydrogenations.

Although heterogeneous catalysts do not afford comparable performance, these catalysts offer other advantages such as ease of catalyst recovery. In order to create an easily separable and reusable catalyst, a number of different techniques have been developed to "heterogenize" homogeneous transition metal catalysts for various catalytic reactions. These techniques involve (i) dissolution of modified homogeneous catalysts in a liquid phase which is not miscible with the reaction solvent, and subsequent support of the non-soluble phase on solid particles, or (ii) covalent linkage of catalyst molecules to silica beads and polymer matrices. These methods, however, result in low surface area catalysts that have only a small fraction of active component exposed to the reaction mixture. These limitations can lead to long reaction times and large reactor volumes.

The synthesis of stereospecific products also presents a great need in the life sciences industry. There are extensive literature reports on the preparation of new asymmetric catalysts through immobilization of chiral metal complexes to solid supports. Immobilization typically involves a covalent linkage via functionalized chiral ligands. This method is successful to some extent as leaching of expensive chiral ligand can be minimized. However, this method does have its drawbacks. The majority of chiral ligands does not contain functional groups that allow direct linkage to solid supports such as silica gels. Modifying the chiral ligand with a functional group is often expensive, involving lengthy synthetic steps, and is detrimental to the selectivity of the catalyst. Furthermore, the sensitivity of the functional groups (i.e. trialkoxysilyl group) towards water tends to complicate synthesis.

Thus, it remains a challenge to prepare catalysts that exhibit high activity and selectivity through immobilization of the catalysts to a surface capable of being easily recovered from solution. It also remains a challenge to prepare asymmetric catalysts having high enantioselectivity. In addition, the immobilized catalysts should ideally be stable to a wide variety of catalytic conditions.

SUMMARY OF THE INVENTION

One aspect of the present invention provides an article comprising an organometallic catalyst immobilized on a polymer-templated composition having at least about 50% of a total pore volume comprising pores with a mean diameter of at least about 50 Å.

Another aspect of the present invention provides an article comprising an asymmetric organometallic catalysts immobilized on a surface via an achiral ligand.

Another aspect of the present invention provides a method for making a catalysts. A method comprises forming a mesoporous composition via a polymer template, the mesoporous composition having at least about 50% of a total pore volume comprising pores with a mean diameter of at least about 50 Å. The method also comprises immobilizing an organometallic catalysts on the mesoporous composition.

Another aspect of the present invention provides a method for performing a catalytic reaction. The method comprises contacting a catalyst with a substrate. The catalyst comprises an organometallic complex immobilized on a mesoporous composition having at least about 50% of a total pore volume comprising pores with a mean diameter of at least about 50 Å.

Another aspect of the present invention provides an article comprising a polymerization catalyst immobilized on a porous composition. The composition has pores of a predetermined mean diameter to define a molecular weight distribution of a polymer.

Another aspect of the present invention provides an article comprising catalyst immobilized on a porous composition. The composition has pores of a predetermined mean diameter to influence stereoselectivity.

Another aspect of the present invention provides a system comprising a plurality of supports. Each support comprises a composition having pores of a mean diameter of at least about 50 Å.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1:
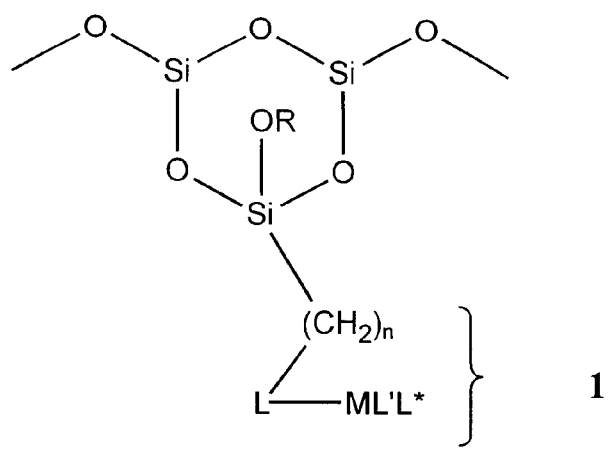
FIG. 1 shows a scheme for covalent immobilization of an organometallic catalyst, 1, to a portion of a mesoporous composition.

The present invention relates to a catalytic system comprising a catalyst immobilized on novel porous support materials. Typical previous porous support materials contain a substantial number of micropores, which, upon immobilizing a catalyst therein, can result in clogging due to the small size of these pores. The present invention relates, in part, to the discovery of materials having ultra-large pores, and the discovery that undesired effects such as clogging are substantially prevented, resulting in a significantly increased catalytic activity, with ultra-large pores. It is believed that catalytic activity is significantly enhanced when catalytic sites are situated within pores of a large diameter.

Thus, one aspect of the present invention provides an article comprising an organometallic catalyst immobilized on a polymer-templated mesoporous composition. "Polymer-templated" refers to a process for making porous materials via the use of polymer microparticles or block co-polymers which can act as a template to control pore size during condensation of inorganic reactants. For example, Zhao et al., incorporated herein by reference, discloses mesoporous materials prepared by amphiphilic block copolymers which have mesostructural ordering properties. (*Science,* Vol. 279, pp. 548–552, Jan. 23, 1998.) A "mesoporous composition" refers to a porous solid having pores of a mean diameter of at least about 20 Å and no more than about 1 $\mu$m. "Mean diameter" refers to the mean of all the pore diameters in the composition.

An advantageous feature of the present invention is that a large percentage of pores in the composition have large diameters ("ultra-large pores"). Many prior art porous materials afford high surface areas by providing numerous pores having mean diameters of 10 Å, or even less. Thus, even though such materials may have pores of a larger diameter, such large pore sizes represent the minority of pores. Small pore sizes present a disadvantage when attempting to immobilize organometallic catalysts because catalysts require a cavity of sufficient size to allow diffusion of reactants into the cavity and diffusion of resulting products out of the cavity.

Thus, it is a discovery of the present invention that pore sizes having a diameter of at least about 50 Å provide a cavity of sufficient size to allow catalysts to occur with high activity. For example, organometallic catalysts can have a dimension ranging from approximately 10 Å to 30 Å (of course the size can vary from this range depending on the metal and ligands involved), and immobilization of such catalysts in a pore having a diameter of at least about 50 Å provides sufficient space to allow the catalyst to provide its maximal activity. Preferably, the pores of the mesoporous composition have a mean diameter of at least 50 Å, more preferably at least about 60 Å, more preferably at least about 100 Å, more preferably at least about 150 Å, more preferably at least about 200 Å, even more preferably at least about 250 Å, and even more preferably still at least about 300 Å.

The materials of the present invention can be distinguished from such prior art porous materials which comprise a majority of small pore sizes and only a few large pore sizes which "artificially" increase the mean pore diameter. In one embodiment, at least about 50% of more preferably at least about 60%, more preferably at least about 70%, and even more preferably at least about 80% a total pore volume comprises pores with a mean diameter of at least about 50 Å, or any of the higher dimensions as defined previously. Thus, it is understood that the present invention encompasses various combinations of pore diameters and percentages of pores having particular diameters. For example, in certain embodiments at least about 50% of the total pore volume comprises pores with a mean diameter of at least about 50 Å or higher, whereas other materials can have at least 60%, 70% or even 80% of the total pore volume comprising pores with a mean diameter of at least about 50 Å or higher.

Materials of the invention having ultra-large pores also generally feature high surface areas. High surface areas allow a large concentration of catalysts to be immobilized on the surface. This provides porous materials with very high catalytic activity. Other advantages of high catalyst concentrations are a lower volume of porous materials required, which is useful for reactors with a limited volume. In addition, contact time and residence time is reduced. High surface areas also allow catalytically active sites to be separated, preventing dimerization of catalysts, or other undesired recombination effects. "Dimerization" can result in a combination of at least two active sites which results in modification of the catalyst, possible loss of catalytic activity and thus, deactivation of the catalyst.

In one embodiment, the composition has a surface area of at least about 500 m$^2$/g, more preferably about 600 m$^2$/g, and even more preferably at least about 700 m$^2$/g. Such high surface areas can form as a result of large pore volumes, such as a total pore volume (sum of volumes of all the pores in the material per unit weight) of at least about 0.5 cm$^3$/g, more preferably at least about 0.6 cm$^3$/g, more preferably at least about 0.7 cm$^3$/g, more preferably at least about 0.8 cm$^3$/g, more preferably at least about 0.9 cm$^3$/g, more preferably at least about 1.0 cm$^3$/g, more preferably at least about 1.1 cm$^3$/g, more preferably at least about 1.2 cm$^3$/g, more preferably at least about 1.3 cm$^3$/g, and more preferably still at least about 1.4 cm$^3$/g. High pore volumes provide a foam material and when coupled with high surface areas and large pore sizes, such foams advantageously optimize conditions for catalytic reactions. For example, diffusion of substrates into the pores to access the catalytically active sites is facilitated, as well as diffusion of products out of the porous materials, with minimal steric hindrance.

The composition can be crystalline, amorphous, or a combination of such features. For example, the composition can have short-range order to afford an x-ray diffraction pattern, yet feature amorphous pore walls.

In one embodiment, the mesoporous composition is a ceramic. Examples of ceramics include carbides, silicides, nitrides and oxides. In a preferred embodiment, the ceramic is an oxide such as a silicate, i.e., includes $SiO_2$ units. Examples of silicates that can be used in the present invention include SBF-15 and mesoporous silica foam (MCF). It is a feature of certain embodiments of the present invention that the organometallic catalysts can be immobilized directly to the silicate without the incorporation of a dopant metal atom into the mesoporous composition.

In another embodiment, the ceramic further includes a dopant metal ion. Dopant metal ions can allow tailoring of the pore size, pore shape, overall charge balance of the composition (i.e. presence and/or number of counterions are influenced by the specific dopant ion used). In addition, dopant ions can immobilize organometallic metallic complexes by coordinating to ligands having an atom capable of donating a lone pair of electrons. Examples of dopant metal ions includes main group metals such as aluminum and boron, transition metals such as niobium, tantalum, titanium and zirconium, and lanthanides and actinides.

"Organometallic catalyst" refers to an inorganic metal complex capable of catalyzing a reaction, typically comprising at least one central metal atom bonded to at least one ligand. In one embodiment, the organometallic catalyst includes a metal, such as a transition metal or a lanthanide. Examples of transition metals include ruthenium, rhodium, iridium, palladium, platinum, osmium, iron, cobalt, nickel, molybdenum, tungsten, copper, gold, silver, zirconium, titanium and hafnium. Other examples of metals in organometallic catalysts include uranium. Preferred metals for carbon-carbon coupling reactions and hydrogenation include ruthenium, rhodium, iridium, palladium and platinum.

In one embodiment, the organometallic catalyst includes a ligand that is immobilized on the mesporous composition. "Immobilized" refers to a chemical interaction between the catalyst and the mesoporous composition, as opposed to physical immobilization, e.g. adsorption or trapping within a glassy matrix. In one embodiment, the catalyst can be covalently immobilized on the porous composition preferably by formation of a covalent bond between the ligand and the mesoporous composition. The covalent bond can be relatively non-polar, i.e. the bonding electrons are relatively localized in the region of the two nuclei sharing the bond. Such covalent bonding typically occurs between two organic substituents or mean group heteroatoms such as silicon, nitrogen, oxygen, phosphorous, sulfur, etc. Alternatively, a covalent bond can involve coordination of an atom having a lone electron pair donated to a metal atom. As will be described in more detail below, this method of immobilization allows facile tailoring of the other ligands to optimize catalytic activity and selectivity. Examples of ligands capable of covalent immobilization to the mesoporous composition include: an amine, a phosphine, an amide, an imine, an amido, a thiol, a thiolate an alkyl, an aryl, an arene, a cyclopentadienyl, an alkoxide, a phosphide, a phosphite, a nitrile, an isonitrile and a sulfonate ligand. The ligand can be monodentate or multi-dentate (e.g., bidentate, tridentate, a porphyrin, a crown ether, a cryptand, etc.). In one embodiment, more than one ligand can immobilize a catalyst. These ligands can be the same or can involve a combination of different ligands.

Another advantageous feature of the present invention provides an organometallic catalyst immobilized on the porous composition which is capable of being well-defined. Previously, due to the nature of ceramics having many possible sites for adsorbing catalysts, the adsorbed catalyst was not easily characterizable, and thus not well-defined. By providing ligands having well-known bonding modes with inorganic complexes (i.e. known by characterization of analogous inorganic complexes in solution), a structure of the resulting immobilized organometallic complex can be controlled. In addition, providing holes arranged in a relatively ordered array facilitates characterization of the complex, leading to the capability of the complex to be well-defined. Accordingly, the structure can be modified and tailored for a particular catalytic reaction. Alternatively, the ligand can be used to simply chelate or scavenge a metal complex from solution, which is useful, for example, in the removal of uranium complexes from solution.

Thus, in one embodiment, the organometallic catalyst is capable of being characterized by a number of techniques, such as x-ray diffraction, NMR, IR, elemental analysis, UV-vis, TGA, differential scanning calorimetry, nitrogen adsorption analysis for surface area analysis and chemisorption analysis for metal analysis. Of course, one of ordinary skill in the art may use a combination of two or more of these techniques to characterize the organometallic catalyst.

Figure 4:
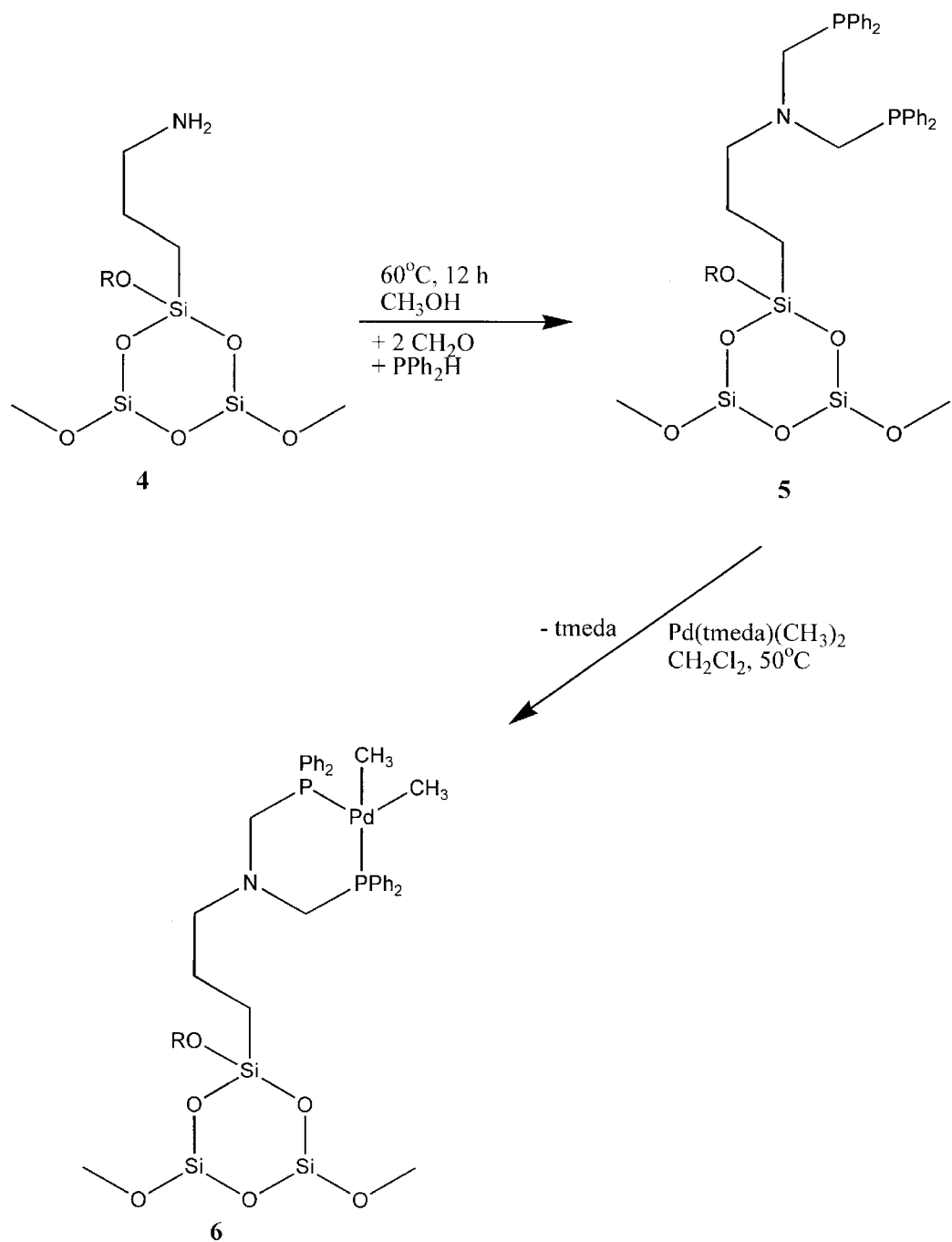
FIG. 4 shows a scheme for immobilizing an organometallic catalyst to a portion of mesoporous composition by reacting the mesoporous composition with a ligand capable of complexing an organometallic catalyst.
Figure 7:
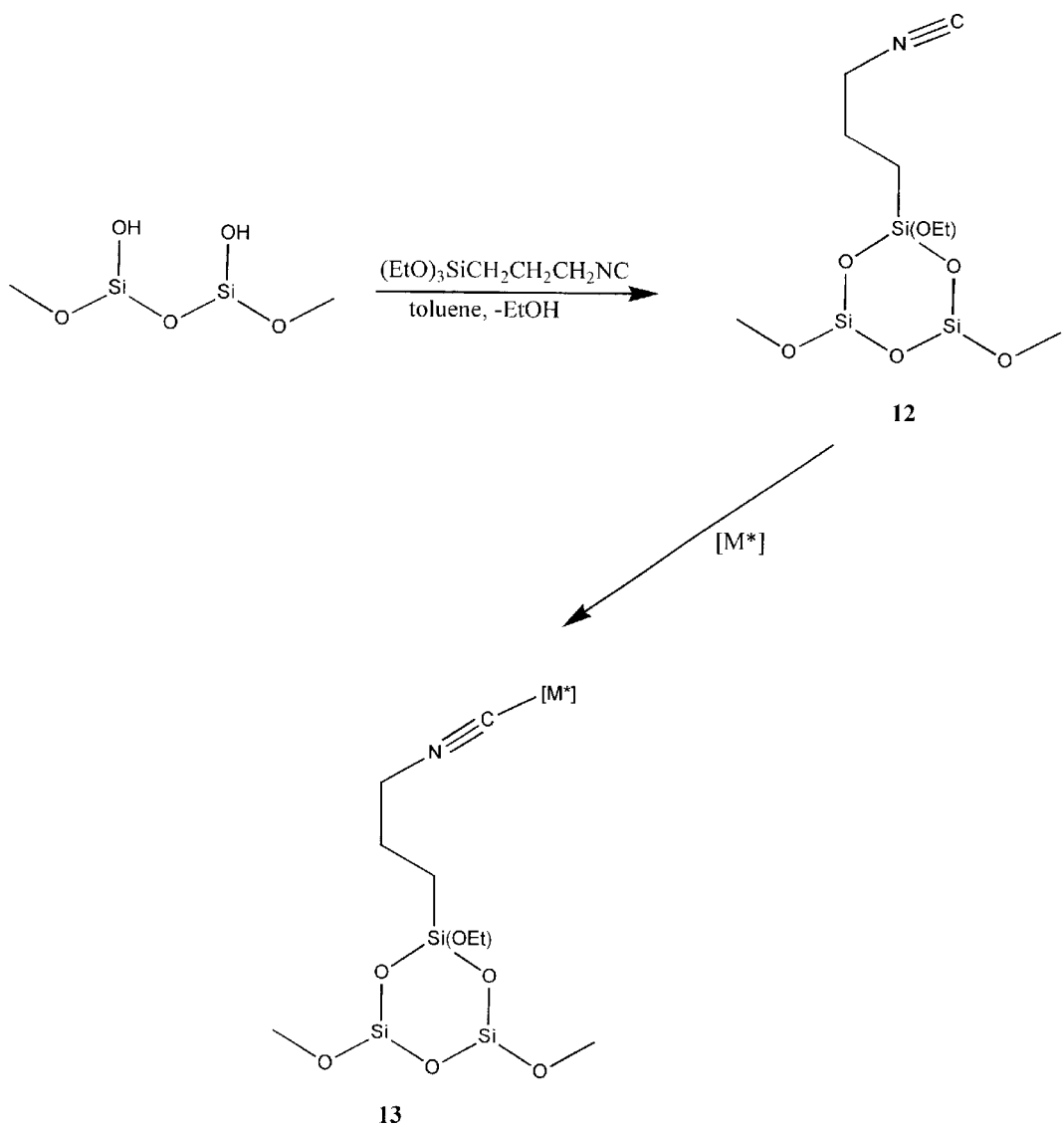
FIG. 7 shows a scheme for immobilizing an organometallic catalyst, [M*], via an isocyanide linkage.

FIG. 4 shows a schematic of a portion of a surface of a mesoporous composition (a silicate, as represented by the $SiO_2$ standard) covalently bonded to a ligand. Species 4 of FIG. 4 comprises a covalent bond formed between a silicon atom of the mesoporous composition and a carbon atom of an amine ligand. The amine ligand of species 4 can in itself be used to bond to an organometallic complex in a coordinative fashion. Alternatively, the amine ligand can be further derivatized with phosphine ligands, as shown in species 5. It is well known that phosphine ligands are excellent candidates for ligating transition metals, such as palladium as shown in species 6. Species 6 includes a bidentate ligand, i.e. the diphosphine ligand, which can complex a $Pd(CH_3)_2$ group. FIG. 7 illustrates derivatization of a silicate surface with an isonitrile capable of complexing an organometallic complex, [M*], where [M*]=(S-BINAP)RuCl$_2$ and BFNAP=2,2'-bis(diphenylphosphine)-1,1'-binaphthyl.

Figure 5:
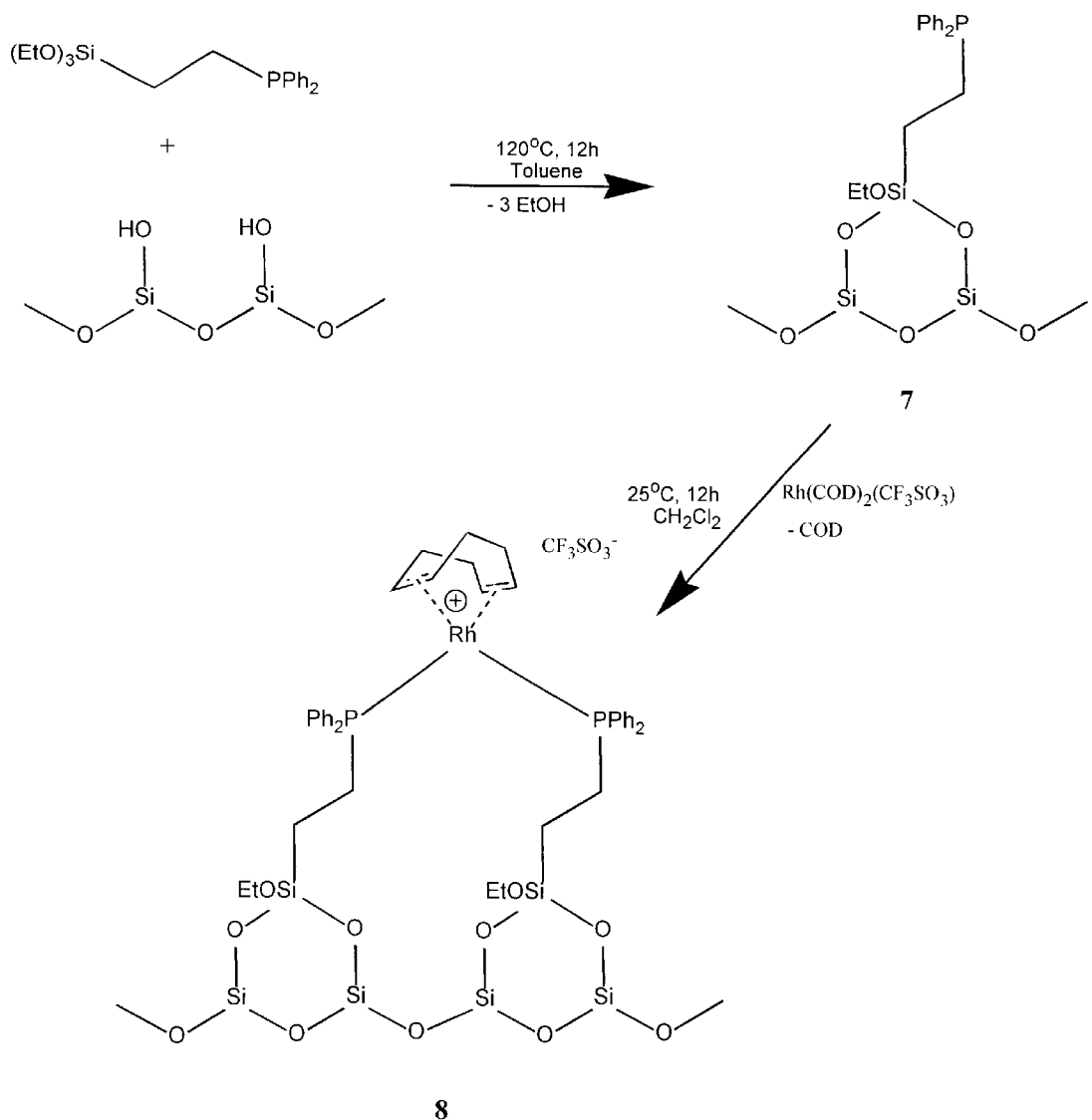
FIG. 5 shows a scheme for immobilizing two adjacent ligands on a portion of a mesoporous composition in which the two adjacent ligands complex one metal center.

FIG. 5 shows an example of immobilizing a metal complex via two separate ligands and a scheme for appending a single phosphine ligand to a portion of a silicate surface. Reaction of the hydroxy groups presented by the silicate surface with a triethoxysilane having a phosphine group, (or any other organic fragment capable of reacting with hydroxy groups to ultimately form a covalent bond) results in the formation of a monophosphine fragment immobilized on the silicate surface, as shown in species 7. Situating two such monophosphine groups adjacent each other results in two available phosphine ligands that can complex a single metal complex, as shown as species 8.

In another embodiment, the organometallic catalyst can be ionically immobilized on the mesoporous composition, preferably having pores of a mean diameter of at least about 50 Å, and other dimensions and pore volume percentages as defined previously. An "ionically immobilized catalyst" involves an inorganic complex having a particular charge that is bound to a site on the composition having an opposite charge. The site can comprise a single charged atom (i.e. a cation or an anion), or at least one charge (+1 or −1 or greater, i.e. +2, −2, etc.) delocalized over a group of atoms. This type of immobilization is distinguished from mere adsorption between neutral species that are partially charged. In one embodiment, ionic immobilization is achieved by ion exchange. For example, the support material prior to ion exchange can have a negative charge counterbalanced by positively charged ions such as metal ions. Typically, these metal ions are alkaline, alkaline earth, or main group metal ions including nitrogen-, sulfur-, phosphorus-based ions (e.g. quaternary ammonium ions, phosphonium ions, sulfonate, etc.). Exposure of this ionic species to a cationic complex can result in ion-exchange of the cationic complex for the positively charged metal ion. This method of immobilization can be achieved for almost any cationic complex.

An advantageous feature of ionically immobilized catalyst is that the end-product catalyst resembles the ionic molecular species in solution. Thus, the catalyst maintains the same high activity as its homogeneous solution counterpart, while providing ease of recovery from the reaction mixture.

Figure 6:
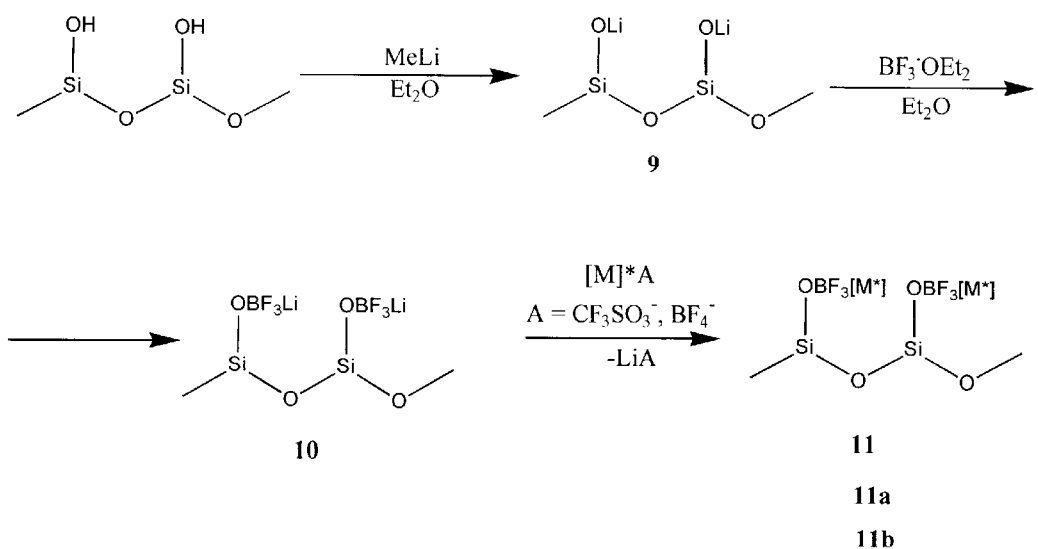
FIG. 6 shows a scheme for ionic immobilization of a metal center [M*]
Figure 6:
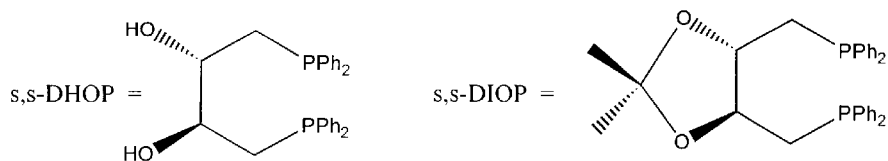

An example of ion-exchange is illustrated in FIG. 6. The protons in surface-bound hydroxy groups can be exchanged for lithium ions, or other analogous ions as described previously. Upon addition of $BF_3$, cationic metal complexes such as 11a and 11b can be ionically immobilized by exchanging the lithium ions for cationic metal complexes [M*]. In 11a, [M*]=(S,S-DHOP)Rh(COD)]$^+$ and in 11b, [M*]=[(S,S-DIOP)Rh(COD)]$^+$.

In one embodiment, the ionically immobilized catalyst is an anionic complex. In this embodiment, the reverse situation exists where an anionic complex ion-exchanges with an anion in the composition.

In one embodiment, catalytic reactions involve hydrogenation, hydroboration, hydrosilylation, hydroformylation, hydrocyanation, epoxidation, carbon-carbon coupling, carbon-nitrogen coupling, polymerization, ring-closing/opening metathesis of olefins and carbonylation. Examples of carbon-carbon coupling reactions are the Heck reaction and Suzuki coupling. The palladium complex of species 6 in FIG. 4 is an example of a catalyst for a Heck carbon-carbon coupling reaction.

Another aspect of the present invention provides an article comprising an organometallic catalyst for catalyzing an asymmetric reaction. An "asymmetric reaction" refers to a stereoselective reaction in which a reactant, either provided as a prochiral molecule, a racemic mixture or as a pure enantiomer, is converted to a product in a stereoselective manner. Preferably, asymmetric catalysts of the invention provide sufficient stereoselectivity such that an enantiomeric excess of at least about 50% is achieved. Preferably, the enantiomeric excess is at least about 60%, more preferably at least about 70%, more preferably at least about 80%, even more preferably at least about 95%, and more preferably still at least about 99%. Examples of asymmetric reactions include reduction of unsaturated substrates and carbon-carbon bond forming reactions. Examples of such reactions include hydrogenation, hydroboration, hydrosilylation, hydroformylation, hydrocyanation, epoxidation, carbon-carbon coupling, carbon-nitrogen coupling, polymerization, ring-closing/opening metathesis of olefins and carbonylation.

An "asymmetric catalyst" refers to a catalyst capable of catalyzing an asymmetric reaction. Typically an asymmetric catalyst is chiral, as provided by chiral ligands. An advantageous feature of the asymmetric catalyst of the present invention provides immobilization of the asymmetric catalyst to a surface via an achiral ligand. Previously, prior art asymmetric catalysts immobilized on solid surfaces involved immobilization through the chiral ligands. Generally, however, the chiral ligand is the most expensive portion of the asymmetric catalyst and functionalizing this ligand to allow immobilization to a surface increases catalyst can be costly. In addition, if a catalyst requires modification for a particular substrate or conditions via screening of different chiral ligands, each new chiral ligand will require functionalization for immobilization on the surface.

In contrast, the present invention advantageously features immobilization through an achiral ligand which is generally inexpensive in relation to the chiral ligand, and/or easier to modify. Thus, the chiral ligand is free of direct-bonding to a surface, and facile substitution of the chiral ligand can occur for screening purposes. Strong achiral ligands include: an amine, a phosphine, an amide, an imine, an amido, a thiol, a thiolate an alkyl, an aryl, an arene, a cyclopentadienyl and its derivatives, an alkoxide, a phosphide, a phosphite, a nitrile, an isonitrile and a sulfonate ligand.

In one embodiment, the surface comprises a mesoporous composition having large pore sizes as described previously and percentages of large pore sizes as described previously.

FIG. 1 shows a schematic of a catalytic composition represented by compound 1; n represents an integer from 0 to 12; L represents at least one achiral ligand capable of immobilization to a surface; M represents a transition metal, which may be charged or neutral; L* represents a chiral ligand; L' represents auxiliary ligands that help to stabilize the metal complexes, such ligands include, but are not limited to, ether, water, olefin, alkyl or hydrogen radical; and —O—Si—O—Si—O— represents a portion of a silicate surface.

One example of an article of the present invention includes asymmetric organometallic catalyst 2 (FIG. 2), in which the chiral ligand is a chiral bidentate phosphine ligand, preferably BINAP. The metal (ruthenium) is linked to the surface of the silica through an isocyanide group and L' represents at least one auxiliary ligand.

Compound 3 (FIG. 3) represents another example of an article of the present invention. In this case, the asymmetric organometallic catalyst is immobilized to the silica surface through an $\eta^6$-coordination with an arene. The chiral ligand is a diamine, such as S,S-TsDPEN (S,S-TsDPEN=S,S-N-(p-toluenesulfonyl)-1,2-diphenylethylenediamine), or a chiral aminoalcohol.

Figure 2:
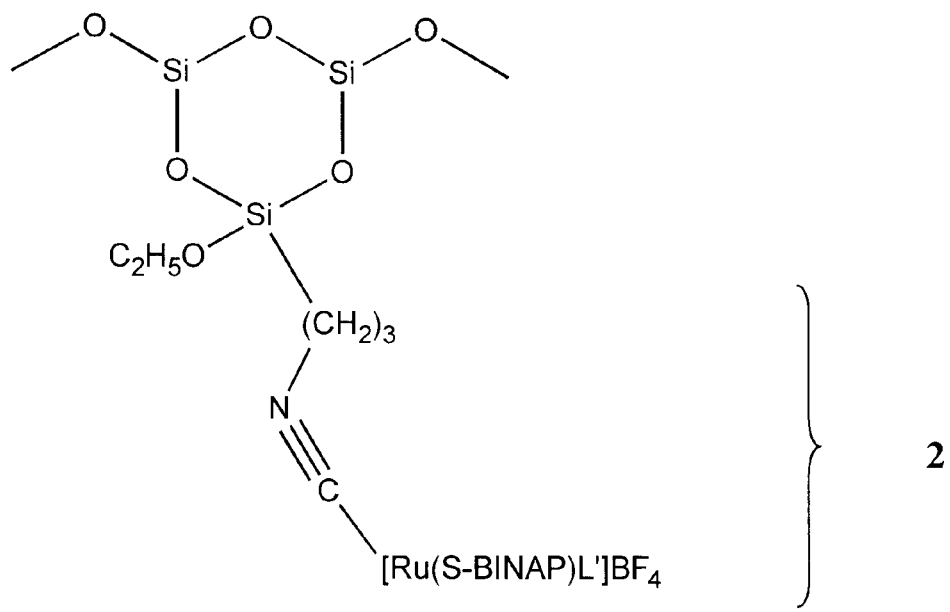
FIG. 2 shows a scheme for covalent immobilization of an organometallic catalyst, 2, to a portion of a mesoporous composition.
Figure 3:
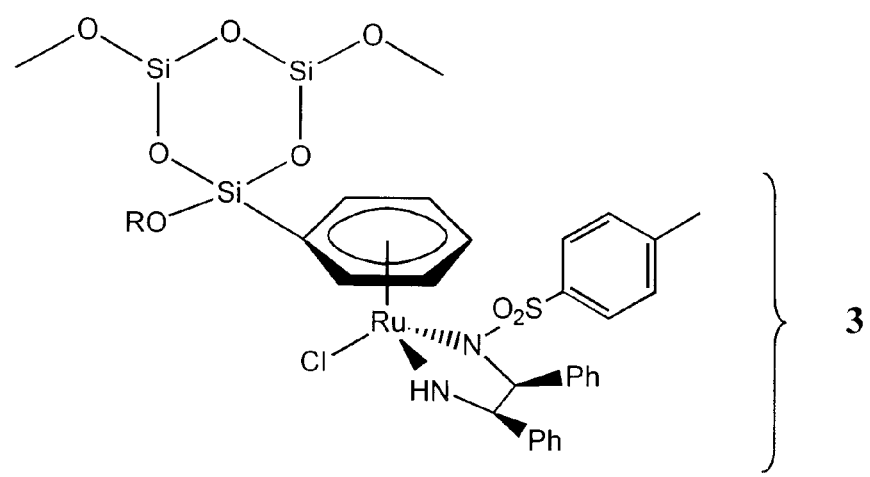
FIG. 3 shows a scheme for covalent immobilization of an organometallic catalyst, 3, to a portion of a mesoporous composition.

It can be seen from FIGS. 2 and 3 that very little modification of the achiral ligand is required to immobilize the catalyst. Thus, the catalyst does not suffer from severe electronic or steric modifications and the catalytic activity of the catalyst is preserved. This allows screening of the molecular catalyst prior to immobilization by using stand solution-type methods. Optimal catalysts can be chosen for immobilization. In one embodiment, the catalyst is "directly immobilized" on the mesoporous composition, i.e. there are no extra linker atoms intervening between the parent molecular catalyst and the mesoporous composition. Direct immobilization can occur covalently or ionically. It is readily understood that in some instances, linker atoms may be necessary.

The catalyst of the present invention can be used as a catalyst in asymmetric hydrogenation of olefins such as, 2-(6-methoxy-2naphthyl)propenoic acid and its methyl ester, α and γ-valerolactone, α-(N-acetylamino) methylacrylate, as well as compounds such as dimethyl itaconate. The article can be recovered by simple filtration or centrifugation and reused for subsequent catalysis runs without significant loss of activity. The article can also be used as catalysts in hydrogenation of acetophenone using isopropanol as hydrogen donor and solvent.

Another aspect of the present invention provides a method for making a catalyst. A method involves forming a mesoporous composition via a polymer template, i.e. a polymer-templated mesoporous composition. The mesoporous composition has at least about 50% of a total pore volume comprising pores with a mean diameter of at least about 50 Å, or other dimensions and percentages as described previously.

The method also comprises immobilizing an organometallic catalyst on the mesoporous composition. The immnobilization can be covalent or ionic. Where the immobilization is covalent, the method can involve providing a ligand having a first site capable of bonding to a metal and a second site reactive with the mesoporous composition. The ligand is then immobilized to the mesoporous composition via the second site. An example of this embodiment as shown in FIG. 5, in which the ligand comprises a first site reactive with the mesoporous composition, i.e. a triethoxysilyl group. The triethoxysilyl group can react with hydroxyl groups inherent in the mesoporous composition via condensation reaction. The ligand also comprises a first site capable of bonding to a metal, i.e. a diphenylphosphino group. In one embodiment, the step of immobilizing further comprises bonding a metal to the ligand via the first site. Referring back to FIG. 5, species 7 shows a portion of a silicate covalently bonded to a diphenylphosphino group which is capable of bonding to a metal. Species 8 of FIG. 5 shows two such diphenylphosphino groups complexing a single rhodium metal. Of course it is understood that the first site can bind to a metal in a 1:1 ratio or any other ratio as known by those of ordinary skill in the art.

Figure 8:
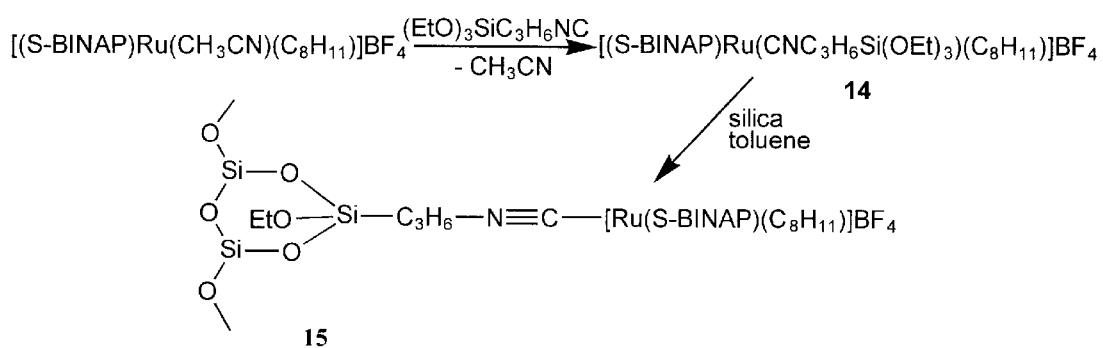
FIG. 8 shows a scheme for immobilizing an organometallic catalyst by providing a catalyst, 14, having a ligand reactive with a mesoporous composition.

In one embodiment, the step of immobilizing comprises providing the organometallic catalyst having a ligand reactive with a mesoporous composition and immobilizing the organometallic catalyst on the mesoporous composition via the reactive ligand. An example of this embodiment is illustrated in FIG. 8. In FIG. 8, the asymmetric organometallic catalyst includes an acetonitrile ligand which can be substituted by an isonitrile group containing a triethoxysilyl group, resulting in a ruthenium isonitrile complex as shown in species 14, in which the isonitrile ligand comprises a triethoxysilyl group reactive with a surface, such as surface-bond hydroxy groups of a silicate. Reaction of species 14 with the silicate results in species 15 in which the metal complex is bound to the silicate via the isonitrile-silyl group linkage.

In one embodiment, the step of immobilizing comprises ionically immobilizing the organometallic catalyst on the mesoporous composition. An example of such immobilization is shown in FIG. 6, which was described previously. FIG. 6 involves exchanging protons present on a surface with a cation, such as an alkaline cation or alkaline earth cation. The cation can then be ion-exchanged with a cationic metal complex [M*]. Alternatively, the metal complex can include a ligand having a group capable of ion exchanging directly with the protons of a surface-bound hydroxy group.

Another aspect of the present invention provides a method for performing a catalytic reaction. The method involves contacting a catalyst with a substrate in which the catalyst comprises an organometallic complex immobilized on a mesoporous composition having at least about 50% of a total pore volume comprising pores with a mean diameter of at least about 50 Å. The mean diameter can be greater than 50 Å as discussed previously and the percentages of the total of pore volume can also have previously recited values. The catalytic reaction can occur in a solution/slurry phase. Alternatively, the reaction can occur in the gas phase. The reaction is a heterogeneous type reaction in which a catalyst can be recovered by filtration or centrifugation and reused for subsequent reactions. Preferably, the activity of the catalyst is substantially maintained during subsequent reactions. In one embodiment, the catalytic reaction is a asymmetric reaction.

In one or more of these embodiments, more than one substrate and/or a substrate and other reactants may be required. For example, in a hydrogenation reaction, a substrate can be an unsaturated species such as an olefin. Hydrogenation occurs where the olefin chemically reacts with the catalysts and is reduced to a more saturated species by the addition of a reactant such as hydrogen gas. An example of a reaction involving two substrates are carbon-carbon coupling reactions.

As non-limiting examples of organometallic complexes immobilized on porous surfaces having previously defined dimensions, palladium complexes (e.g. see species 6 of FIG. 4), rhodium complexes (e.g. see, for example, species 8 of FIG. 5 and species 11a and 11b of FIG. 6) and ruthenium phosphine complexes (e.g. see, for example, species 13 of FIG. 7) have been immobilized on the surface of mesoporous materials by a number of different methods. Catalytically active complexes have been bound to mesoporous supports by condensing alkoxysilanes modified with amine, phosphine, or isonitrile groups to the surface of the mesopores in processes similar to those described for the immobilization of palladium complexes. The ion-exchange of cationic organometallic compounds onto the anionic surfaces of modified mesoporous silicates, such as aluminum-doped silicates or [$BF_3$]-modified silicates, is also an effective means of immobilizing a wide range of compounds onto mesoporous materials. And lastly strong niobium-nitrogen bonds can be used to anchor amine-containing organometallic complexes to niobium-doped silicate surfaces.

Another aspect of the present invention relies in part on the large pore sizes of the composition to further refine stereoselectivity. In this aspect, the composition has pores of a predetermined mean diameter to influence stereoselectivity. Depending on a particular substrate and desired enantiomer, it is possible to choose a predetermined pore size such that the pores dictate a particular orientation of the catalyst and substrate orientation, resulting in high stereoselectivity.

Another aspect of the present invention provides an article comprising a polymerization catalyst. The polymerization catalyst is immobilized on a porous composition where the composition has pores of a predetermined mean diameter to define a molecular weight distribution of a polymer. This aspect provides a novel method for obtaining polymers with relatively low polydispersity values. Polymer growth is limited to the size of the pores, i.e., upon formation of a polymer that completely occupies a pore, monomers can no longer enter into the pore and polymerization ceases. Typical polymerization catalyst involves carbon-carbon coupling, carbon-nitrogen coupling, ring opening metathesis and other coupling reactions.

Another aspect of the present invention provides porous materials that can be used for combinatorial chemistry. In combinatorial chemistry, a support material is typically used to bind at least one reactant or catalyst. The reactant is then exposed to a variety of other reactants. In particular, a combinatorial library can be achieved by providing a plurality of support materials, for example provided as beads, where each bead is bound to the same reagent. Each bead containing the reagent is then exposed to a unique second reagent such that a different chemical reaction occurs on each different bead. Typically, the first reagent is supported on a surface of the bead. The use of porous material as analogs for combinatorial supports are not known. Porous support materials can increase the extent of reaction on a bead due to the high surface area provided by the support material. Advantages of using porous supports include high catalytic concentration resulting in high catalytic activity and high yields.

The function and advantage of these and other embodiments of the present invention will be more fully understood from the examples below. The following examples are intended to illustrate the benefits of the present invention, but do not exemplify the full scope of the invention.

EXAMPLE 1
Fabrication of Mesoporous Supports

This example outlines the synthesis of porous materials having large pore sizes. SBA-15 and mesoporous silica foam (MCF) materials have been prepared in a similar manner to the published literature (SBA-15: D. Zhao, et al, Science, 1998, vol. 279, pp. 548–552; MCF: P. Schmidt-Winkel, Journal of the American Chemical Society, 1999, vol. 121, pp. 254–255). These materials are prepared by first dissolving poly(ethylene oxide)-poly(propylene oxide)-poly(ethylene oxide) triblock copolymer ($EO_{20}PO_{70}EO_{20}$, MW=5800) in 1.6 M HCl aqueous solution at 35–40° C. 1,3,5-trimethylbenzene (oil or swelling agent) is then added to the polymer solution with the oil:polymer mass ratio ranging from 0 to 2, and the mixture is stirred for at least 1 h. Tetraethylorthosilicate (TEOS) is added as the silica source. Alumina and niobia may be doped into the material through the simultaneous addition of TEOS and $AlCl_3$ or $NbCl_5$. After stirring for 24 h at 35–40° C. and aging for 24 h at 80–120° C., the solids are collected by filtration and dried in air. The resulting powder is calcined at 500° C. for 6 h to produce the mesoporous silica-based material.

When oil:polymer mass ratios below 0.2 are used in the synthesis procedure, SBA-15 mesoporous materials are formed. SBA-15 consists of a hexagonally-packed array of cylindrical pores with median pore diameters of 60–100 Å. The material gives distinct small-angle X-ray scattering (SAXS) peaks with d-spacings of (100) 104 Å, (110) 59 Å, (200) 51 Å. The BET surface area of SBA-15 is typically in excess of 900 $m^2/g$. For oil:polymer mass ratios >0.2, MCF are formed. The mesoporous foam materials have median pore diameters of 150–350 Å and surface areas in excess of 700 $m^2/g$.

Characteristics of Porous Materials

SBA-15: consists of a hexagonal array of long, straight cylindrically shaped pores
Surface area: >700 $m^2/g$
Median pore size: 50–150 Å
Pore size distribution: 80% of pores within ±10 Å (as determined by fraction of total pore volume, i.e. volume of pores with median diameter ±10 Å/total pore volume)
Pore volume: >0.6 $cm^3/g$
Porosity: >50% (i.e. void fraction >0.5)
Constriction factor (defined as the ratio of the widest diameter of the pore to the narrowest diameter of the pore): <2
Mesoporous Silica Foam: consists of spherical pores interconnected by small windows, the spherical pores need not be packed in any specific arrangement
Surface area: >600 $m^2/g$
Median pore size: 150–400 Å
Pore size distribution: 80% of pores within ±100 Å of the median pore diameter
Pore volume: >1.4 $cm^3/g$
Porosity: >75%
Constriction factor: 1–5

EXAMPLE 2
Immobilization of Transition Metal Catalysts on Mesoporous Supports

[$(SiO_2)(CH_2)_3NH_2$], compound 4 (FIG. 4). The synthesis of mesoporous silicates with palladium-phosphine complexes immobilized on their surfaces, referred to as Pd-TMS12$^c$ catalysts ("$^c$" defines a complex), began with the removal of surface contamination from the mesoporous support by treating the support at elevated temperature (100–200° C.) under vacuum for several hours. Degassed mesoporous silicate-based SBA-15 material was treated with 3-aminopropyltriethoxysilane to initiate the condensation reaction between surface-bound hydroxy groups and the ethoxysilane fragments, forming the surface immnobilized aminopropyl complex 4 in FIG. 4. This was accomplished by suspending the mesoporous material in a solution of 3-aminopropyltriethoxysilane in n-heptane and refluxing for 12 h.

After the supernatant was filtered off and the residue was washed with pentane (3×50 ml), the material was dried under reduced pressure ($10^{-2}$ Torr) for 5 h, yielding the mesoporous powder with aminopropyl complex covalently bound to the surface [FTIR: v(NH) 3200 $cm^{-1}$; $^{29}$Si-NMR (CP/MASS): δ−108.7 ppm [$SiO_2$ framework], −60.1 ppm [$(RO)_3Si$—$CH_2$—]; elemental analysis: 12.7 wt % C, 2.9 wt % H, 2.8 wt % N].

[$(SiO_2)(CH_2)_3N(CH_2PPh_2)_2$], compound 5 (FIG. 4). The next step of the synthesis involved the introduction of the phosphine fragments using diphenylphosphine and para-formaldehyde. The aminopropyl-modified material was suspended in methanol, and introduced to a clear solution of para-formaldehyde and diphenylphosphine in methanol that was refluxed for 4 h prior to the addition. After the reaction mixture was refluxed for 12 h, the supernatant was filtered off and the resulting residue was washed with pentane. The isolated material was dried under reduced pressure ($10^{-2}$ Torr) for 5 h, giving a white powder with the chelating phosphine complex anchored throughout the mesoporous framework [$^{29}$Si-NMR (CP/MASS): δ−109.9 ppm [$SiO_2$ framework], −57.8 ppm [$(RO)_3Si$—$CH_2$—]; $^{31}$P-NMR (CP/MASS): δ−27.7 ppm [—$CH_2$—$PR_2$]; elemental analysis: 26.9 wt % C, 3.1 wt % H, 2.2 wt % N].

[(SiO$_2$)(CH$_2$)$_3$N(CH$_2$PPh$_2$)$_2$][Pd(CH$_3$)$_2$], compound 6 (FIG. 4). In the final step of the synthesis, compound 5 was treated with a solution of Pd(tmeda)(CH$_3$)$_2$ (tmeda= tetramethylethylenediamine) complex in CH$_2$Cl$_2$ and heated at 50° C. for 6 h, to give the catalytically active surface-anchored palladium complex 6 in FIG. 4. After the supernatant was filtered off, the residue was washed with pentane and dried under reduced pressure for 5 h, yielding a beige powder Pd-TMS12$^c$ (compound 6) [SAXS (100) 102 Å; BET surface area of 161 m$^2$/g; BJH average adsorption pore size of 40.0 Å; $^{29}$Si-NMR (CP/MASS): δ–111.0 ppm [SiO$_2$ framework], –59.4 ppm f(RO)$_3$Si—CH$_2$—]; $^{31}$P-NMR (CP/MASS): δ–8.4 ppm [—CH$_2$—PR$_2$]; elemental analysis: 24.8 wt % C, 3.0 wt % H, 2.2 wt % N, 2.3 wt % P, 4.1 wt % Pd].

The resulting material, Pd-TMS12$^c$, retained its hexagonally-packed porous structure as shown by SAXS. Transmission electron microscopy (TEM) confirmed the hexagonally-packed structure of the large pores in Pd-TMS12$^c$. The BET surface area of Pd-TMS12$^c$ was 161 m$^2$/g, which was less than that found for the untreated SBA-15 material (994 m$^2$/g). The BJH (Brunauer-Joyner-Halenda) pore size distribution of Pd-TMS12$^c$ exhibited a narrow peak centered at 40.0 Å, which was smaller than for SBA-15 (70.5 Å). In contrast, when identical surface modifications were carried out on MCM-41 material with a surface area of ~1000 m$^2$/g and an average pore size of 27.4 Å, a non-porous material with a surface area of 6 m$^2$/g was produced. Upon carrying out a hydrogenation of C$_6$H$_5$Br with the same conditions for Table 1, the turnover number achieved was less than 50 resulting in catalytic activity of less than 1/100 the activity of the catalytic system of the present invention in which the catalyst resides in a pore sizes having diameters of greater than 50 Å. This observation shows that the starting pore size of a support material is of crucial importance for the preparation of surface-modified molecular sieves, especially when sterically-demanding complexes are involved.

Similar procedures have been used to fixate palladium-phosphine complexes onto mesoporous silica foams. Due to the lager pore diameters of the mesoporous foams, as compared to the SBA-15 mesoporous materials, the pore channels can more easily accommodate large catalytically active organometallic complexes while allowing for facile diffusion of substrate molecules. Active palladium complexes have been formed on the surface of mesoporous foam materials by covalently bonding a number of different chelating phosphine ligands to the surface of the silica foam.

In addition to palladium complexes, rhodium and ruthenium phosphine complexes have been immobilized on the surface of mesoporous materials by a number of different methods. First, catalytically active complexes have been bound to mesoporous supports by condensing alkoxysilanes modified with amine, phosphine, or isonitrile groups to the surface of the mesopores in processes similar to those described for the immobilization of palladium complexes. The ion-exchange of cationic organometallic compounds onto the anionic surfaces of modified mesoporous silicates, such as aluminum-doped silicates or [BF$_3$]$^-$ modified silicates, is also an effective means of immobilizing a wide range of compounds onto mesoporous materials. Also, strong niobium-nitrogen bonds can be used anchor amine-containing organometallic complexes to niobium-doped silicate surfaces.

(SiO$_2$)CH$_2$CH$_2$PPh$_2$, compound 7 (FIG. 5). One method of fixating active rhodium compounds to the surface of silica supports involved condensing triethylsilane ethyldiphenylphosphines onto mesoporous silica supports. The condensation reaction was accomplished by mixing triethoxysilane ethyldiphenylphosphine with the silica foam support in toluene and heating the mixture to 120° C. for ~12 h. This process afforded the compound 7 (FIG. 5).

{[(SiO$_2$)CH$_2$CH$_2$PPh$_2$]$_2$Rh(COD)J}[CF$_3$SO$_3$], compound 8 (FIG. 5). Once the diphenylphosphine groups were immobilized on the surface of the mesoporous silica foam, conversion to an active catalyst was achieved by treating the modified support with Rh(COD)$_2$(CF$_3$SO$_3$) in methanol or toluene at 25° C. for ~12 h, yielding compound 8 (FIG. 5). SAXS (100) 350 Å; BET surface area=774 m$^2$/g; adsorption pore size=300 Å; elemental analysis: 17 wt % C, 2 wt % H, 2 wt % P, 3 wt % Rh.

[(SiO$_2$)CH$_2$CH$_2$PPh$_2$(s-BINAP)Ru(C$_8$H$_{11}$)]BF$_4$. The diphenylphosphine groups immobilized on the surface of the mesoporous silica foam were also converted to an asymmetric catalyst by treating the modified support with [[(s-BINAP)Ru(C$_8$H$_{11}$)(CH$_3$CN)]BF$_4$ (synthesized according to Bergens et al. *Organometallics* 1996, 15, 3782) in methylene chloride. The mixture was stirred at 25° C. for ~6 h, to give the immobilized catalyst. SAXS (100) 340 Å; BET surface area=742 m$^2$/g; adsorption pore size=275 Å.

(SiO$_2$)CH$_2$CH$_2$SH. The condensation of triethylsilane ethanethiol onto mesoporous silica was accomplished by mixing triethoxysilane ethanethiol with the silica foam support in toluene and heating the mixture to 110° C. for ~12 h. The resulting white powder was filtered and washed with toluene and pentane to remove any physically adsorbed compounds.

[(SiO$_2$)CH$_2$CH$_2$SH(s-BINAP)Ru(C$_8$H$_{11}$)]BF$_4$. The thiol groups immobilized on the surface of the mesoporous silica foam were converted to an asymmetric catalyst by treating the modified support with [[(s-BINAP)Ru(C$_8$H$_{11}$)(CH$_3$CN)]BF$_4$ (synthesized according to Bergens et al. *Organometallics* 1996, 15, 3782) in methylene chloride. The mixture was stirred at 25° C. for ~6 h, to give the immobilized catalyst. SAXS (100) 302 Å; BET surface area 712 m$^2$/g; adsorption pore size 245 Å.

[SiO$_2$]-OLi, compound 9 (FIG. 6). MCF (0.20 g) was suspended in diethyl ether (5 mL) in liquid nitrogen and isopropanol bath. To the cold ether solution, methyl lithium (1.0 mL) was added via syringe. The mixture was warmed to room temperature and stirred for 10 min. The solution was evaporated to dryness in vacuum and the powder was dried at 120° C. for 3 h to give a white powder. Elemental analysis: 2.29 wt % Li.

[SiO$_2$]OBF$_3$Li, compound 10 (FIG. 6). The above powder (150 mg) was suspended in diethyl ether (5 mL) and cooled to –78° C. by a dry-ice and acetone bath. To the mixture, BF$_3$OEt$_2$ (133 mL) was added via syringe. The mixture was warmed to room temperature and the volatiles were evaporated to give a white powder, which was dried at 100° C. in an oil bath under vacuum (2×10$^{-2}$ mmHg) for 3 h.

[(SiO$_2$)OBF$_3$][(DIOP)Rh(COD)], compound 11b (FIG. 6). The powder (100 mg) obtained from the previous step was mixed with [(DIOP)Rh(COD)][CF$_3$SO$_3$] (30 mg, prepared by reaction of DIOP with [Rh(COD)$_2$][CF$_3$SO$_3$]) in toluene (5 mL). The heterogeneous mixture was stirred for 1 h at room temperature. The solid was filtered and washed with toluene until the toluene phase was colorless. The resulting yellow solid was washed with water (to remove the Li(CF$_3$SO$_3$) produced) three times and dried under vacuum to give a bright yellow powder (105 mg). Elemental analysis: 14.7 wt % C, 2.46 wt % H, 1.64 wt % P, 6.01 wt % F, 0.15 wt % S, 2.06 wt % Rh, 0.36 wt % B.

[(SiO$_2$)OBF$_3$][(DHOP)Rh(COD)], compound 11a (FIG. 6). The same method as the synthesis of(SiO$_2$)OBF$_3$]

[(DIOP)Rh(COD)], except [[(DHOP)Rh(COD)][CF$_3$SO$_3$] was used instead of [(DIOP)Rh(COD)][CF$_3$SO$_3$].

[SiO$_2$]CH$_2$CH$_2$CH$_2$NC, compound 12 (FIG. 7). MCF (300 mg) was dried in a 150° C. oil bath at 2×10$^{-2}$ mmHg for 12 h. To the solid, (EtO)$_3$SiCH$_2$CH$_2$CH$_2$NC (600 µL) and toluene (3 mL) were added and the mixture was refluxed for 12 h. The powder's color changed from white to orange. The solid was filtered, washed with toluene three times and dried at 120° C. under vacuum for 5 h to give 200 mg of orange powder. Elemental analysis: 11.02 wt % C, 1.98 wt % H, 1.48 wt % N. IR (Photoacoustic): 2146 cm$^{-1}$ (vCN).

Figure 9:
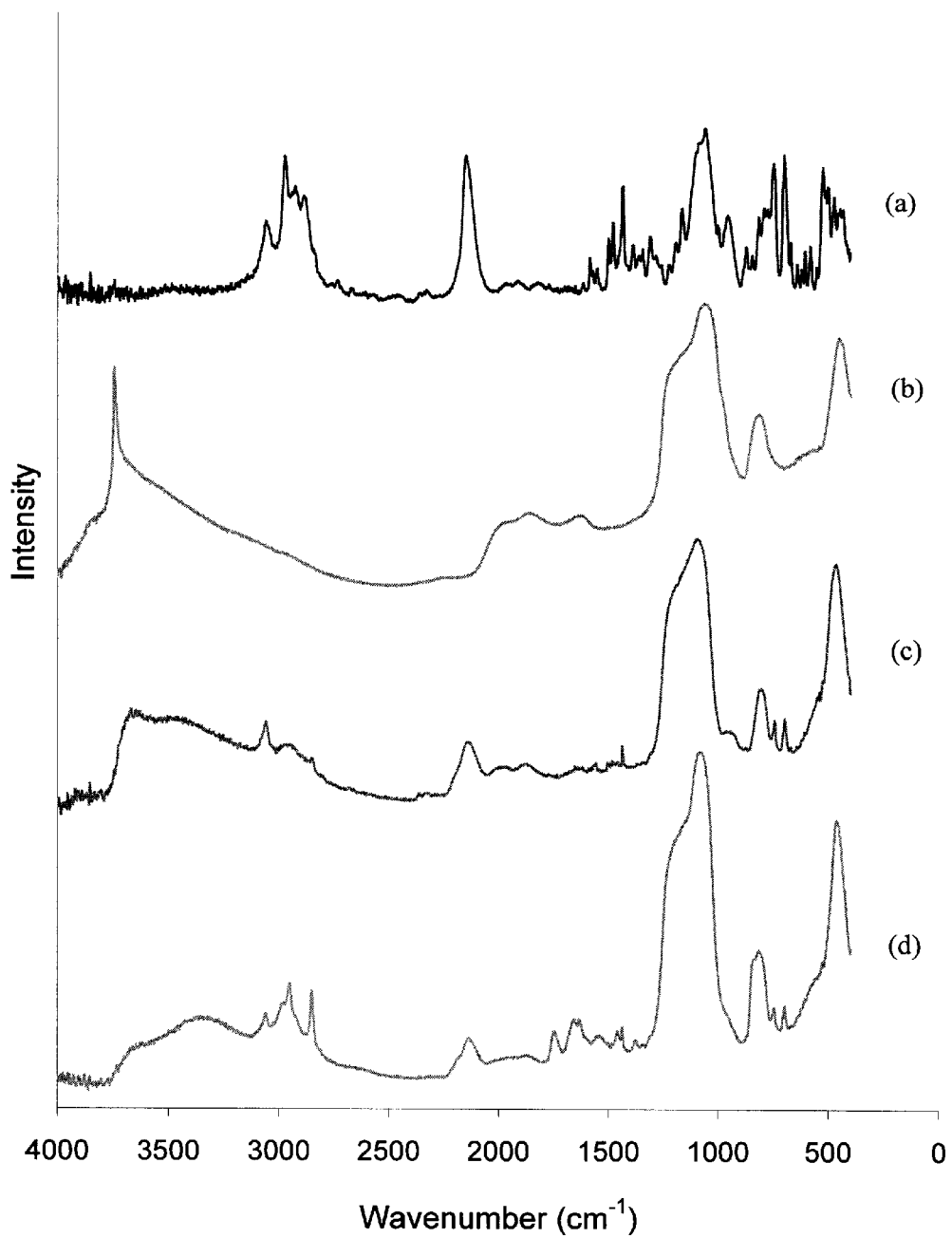
FIG. 9 shows photoacoustic infrared spectra of (a) a homogenous ruthenium catalyst, (b) the mesoporous material before immobilization of the ruthenium catalyst, (c) after immobilization of the ruthenium catalyst, and (d) after immobilization and a methanol rinse.

[(SiO$_2$)CH$_2$CH$_2$CH$_2$NC]Ru(S-BINAP)Cl$_2$, compound 13 (FIG. 7). (SiO$_2$)CH$_2$CH$_2$CH$_2$NC (100 mg) and [Ru(s-BINAP)Cl$_2$]$_x$ (30 mg) were mixed in toluene (10 mL) and stirred for 12 h. The liquid phase turned almost colorless. The volatiles were removed to give an orange solid with a trace amount of blue-colored solid. Yield: 105 mg. Elemental analysis: 22.34 wt % C, 2.87 wt % H, 1.28 wt % N, 1.74 wt % Ru, 1.35 wt % P. [(S-BINAP)Ru(C$_8$H$_{11}$)(CNC$_3$H$_6$Si (OC$_2$H$_5$)$_3$)]BF$_4$, compound 14 (FIG. 8). [[(s-BINAP)Ru (C$_8$H$_{11}$)(CH$_3$CN)]BF$_4$ (3.4 g, 0.035 mol, synthesized according to Bergens et al. *Organometallics* 1996, 15, 3782) was dissolved in methylene chloride (30 mL). To the orange solution, CNC$_3$H$_6$Si(OC$_2$H$_5$)$_3$ (0.89 g) was added using a syringe. The mixture was stirred at room temperature for 15 min and concentrated to ca. 15 mL. To the light yellow solution, pentane (150 mL) was layered and the mixture was stirred to give a yellow solid. The solid was filtered, washed with pentane and dried to give 3.2 g of product. Calculated for C$_{62}$H$_{64}$NO$_3$BF$_4$P$_2$RuSi: 64.81 wt % C, 5.61 wt% H, 1.22 wt% N. Experimental: 63.90 wt% C, 5.87 wt% H, 1.57 wt% N. $^{13}$C NMR (100 MHz, CD$_2$Cl$_2$, 20° C): 8.40(s, CH$_2$Si), 18.5, (s, CH$_3$), 59.0 (s, CH$_2$O), 20.1 (d), 23.4, 23.5, 23.8, 24.4, 25.3, 26.3, 27.1, 31.9, 34.5, 36.4, 41.1, 42.4, 47.0, 48.1, 48.6, 54.4, 57.5, 58.8, 59.0, 61.2, 65.1, 65.3, 70.0, 70.2, 92,8, 95.9, 100.8, 100.9, 109.6, 109.7. $^{31}$P{$^1$H}NMR (162 MHz): 44.2 (d, J$_{PP}$=31 Hz), 43.3 (d, J$_{PP}$=29.6 Hz), 31.70 (d, J$_{PP}$32 29.6), 30.9 (d, J$_{PP}$=31 Hz). IR (photoacoustic): 2154cm$^{-1}$ (vCN). Immobilization of [(S-BINAP)Ru(C$_8$H$_{11}$) (CNC$_3$H$_6$Si(OC$_2$H$_5$)$_3$)]BF$_4$ on mesoporous silica. MCF (BET surface area: 767 m$^2$/g, median pore size: 250 Å, Pore volume: 2.3 cm$^3$/g, elemental analysis: 0.36 wt % C, 0.60 wt % H, 0.32 wt % N) was dried at 5×10$^{-2}$ mmHg acuum at 140° C. for 12 hours. To the silica foam,[(S-BINAP)RU (C$_8$H$_{11}$)(CNC$_3$H$_6$Si(OC$_2$H$_5$)$_3$)]BF$_4$ (1.0 g), toluene (150 mL) and water were added. The mixture was heated with stirring in a 95° C. oil bath for 12 hours. The yellow slurry was filtered to remove the colorless toluene solution. The solid was washed with methanol (3×40 mL) and methylene chloride (20 mL) and then methanol (20 mL) to remove any physically absorbed complex. The resulting yellow powder was dried at 95° C. for 1 hour. Yield: 3.40 g. The product is numbered as 15 (FIG. 8). Elemental analysis: 16.77 wt % C, 1.61 wt % H, 0.57 wt % N, 0.68 wt % P, 1.24 wt % Ru. BET surface area: 523 m$^2$/g, BJH adsorption pore volume: 1.28 cm$^3$/g, median pore diameter: 264 Å. IR (photoacoustic): see FIG. 9(c).

Fixation of [(s-BINAP)Ru(C$_8$H$_{11}$)(CNC$_3$H$_6$Si(OC$_2$H$_5$)$_3$)] BF$_4$ on commercial silica gel. Large pore silica gel (Strem, BET surface area: 307 m$^2$/g) was dried at 140° C. under vacuum for 12 h. To the silica, [(s-BINAP)Ru(C$_8$H$_{11}$) (CNC$_3$H$_6$Si(OC$_2$H$_5$)$_3$)]BF$_4$ (1.0 g), toluene (150 mL), and water (0.12 mL) were added The mixture was heated with stirring in a 95° C. oil bath for 12 h. The yellow slurry was filtered to remove the colorless toluene solution. The solid was washed with methanol (3×40 mL) and methylene chloride (20 mL) and then methanol (20 mL) to remove any physically absorbed complex. The resulting yellow powder was dried at 95° C. for 1 h. Yield: 3.0 g. Elemental analysis: 12.27 wt % C, 1.09 wt % H, 0.40 wt % N, 0.59 wt % P, 0.43 wt % Ru. BET surface area: 292 m$^2$/g, BJH adsorption pore volume: 1.13 cm$^3$/g, median pore diameter: 326 Å.

Figure 10:
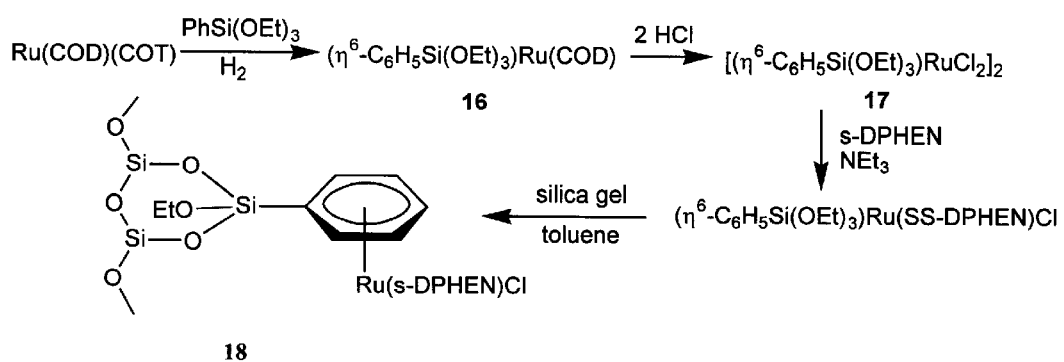
FIG. 10 shows a scheme for immobilization of an asymmetric organometallic catalyst via reaction of a reactive ligand on the catalyst with the mesoporous composition.

Synthesis of ($\eta^6$-C$_6$H$_5$Si(OEt)$_3$)Ru($\eta^4$-COD), compound 16 (FIG. 10). Ru(COD)(COT) (600 mg, 1.9 mmol) and C$_6$H$_5$Si(OEt)$_3$ (5 mL) were mixed in a reactor, which was pressurized by hydrogen to 40 psi. The mixture was stirred for 24 hours to give a dark orange solution and during the reaction the hydrogen pressure decreased to ca. 15 psi. The solution was taken into a glovebox and transferred to a Schlenk flask. The volatiles were evaporated under vacuum, and the remaining solid was dissolved in pentane and filtered through an alumina (neutral) column. The yellow fraction was collected and the solvent removed in vacuo to give 820 mg (96%) oil. $^1$H NMR (C$_6$D$_6$, 400 MHz, 20° C): 1.15 (t, 9 H, J=7.0 Hz, CH$_3$), 2.17–2.30 (m, 8H, CH$_2$ of COD), 3.61 (m, 4H, CH of COD), 3.91 (q, 6H, J=6.7 Hz, OCH$_2$), 4.60 (m, 2H, Ph), 4.90 (d, 2H, Ph), 5.57 (t, 1H, para H of Ph). $^{13}$C{$^1$H} NMR (CD$_2$Cl$_2$, 100 MHz, 20° C): 18.7 (s, CH$_3$), 34.3 (s, CH$_2$ of COD), 59.3 (s, CH$_2$O), 61.7 (CH of COD), 84.0, 86.1, 87.3, 90.4 (s, ipso, ortho, meta, para C of Ph).

Synthesis of [(C$_6$H$_5$Si(OEt)$_3$)RuCl$_2$]$_2$, compound 17 (FIG. 10). In a schlenk flask, ($\eta^6$-C$_6$H$_5$Si(OEt)$_3$)Ru($\eta^4$-COD) (438 mg, 0.97 mmol) was dissolved in pentane (10 mL). To this solution, hydrogen chloride (1.0 mol/L in diethyl ether) was added via a syringe. After half the total amount of hydrogen chloride had been added, the solution turned brown and a precipitate formed. Once the full amount of hydrogen chloride had been added, the mixture was stirred for 10 min and the volatiles were removed in vacuo overnight to give a brown precipitate. The precipitate was dissolved in methylene chloride (20 mL) and filtered through a Celite pad. The filtrate is concentrated to ca. 10 mL and layered with pentane to give dark brown crystals. Yield: 300 mg. Elemental analysis: calculated for C$_{12}$H$_{20}$Cl$_2$O$_3$RuSi: 34.96 wt % C, 4.90 wt % H. Experimental: 34.69 wt % C, 4.70 wt % H. $^1$H NMR (400 MHz, CD$_2$Cl$_2$, 20° C.): 1.26 (t, 9H, J=7 Hz, CH$_3$), 4.0 (q, 6H, J=7 Hz, CH$_2$O), 5.62 (m, 2H, Ph), 5.79 (m, 3H, Ph). $^{13}$C{$^1$H} NMR (CD$_2$Cl$_2$, 100 MHz, 20° C.): 18.4 (s, CH$_3$), 60.0 (OCH$_2$), 75.7. 79.5, 88.0, 91.4 (s, Ph).

Synthesis of ($\eta^6$-C$_6$H$_5$C$_2$H$_4$Si(OCH$_3$)$_3$)Ru(COD) and [(C$_6$H$_5$C$_2$H$_4$Si(OCH$_3$)$_3$)RuCl$_2$]$_2$. Ru(COD)(COT) (300 mg) and C$_6$H$_5$C$_2$H$_4$Si(OCH$_3$)$_3$ (5 mL) were mixed in a reactor, which was pressurized with 55 psi of hydrogen. The mixture was stirred at room temperature and the color of the solution changed to blackish orange. After 60 min of stirring, the hydrogen pressure in the reactor had dropped to 38 psi. The hydrogen pressure was released and the mixture was analyzed by $^1$H NMR spectrum to reveal 100% conversion of Ru(COD)(COT). $^1$H NMR spectrum of ($\eta^6$-C$_6$H$_5$C$_2$H$_4$Si (OCH$_3$)$_3$)Ru(COD): 1.00 (m, CH$_2$Si)$_2$, 3.2 (m, 8H, CH$_2$ of COD), 2.39 (m, 2H, CH$_2$Ph), 3.40 (s, 4H, CH of COD), 3.49 (s, 9H, CH$_3$O), 4.67 (m, 2H, Ph), 4.71 (m, 2H, Ph), 5.0 (m, 1H, Ph). The mixture was transferred to a glovebox and filtered through an alumina (neutral) column to remove the black solid. The yellowish black filtrate was reacted with 1.32 mL hydrogen chloride (1.0 mol/L) in diethyl ether to give a brown solution. Pentane (20 mL) was added to the brown solution yielding a brown solid. The supernatant was decanted and the residue was dissolved in methylene chloride (10 mL). The solution was filtered to remove the small amount of the insoluble impurity. The filtrate was recrystallized with pentane (20 mL) to give a brown solid. The solid was isolated by centrifugation followed by washing with pentane and drying in vacuo. Yield: 100 mg. $^1$H NMR (400 MHz, $CD_2Cl_2$, 20° C.): 0.83 (m, 2H, $CH_2Si$), 2.48 (m, 2H, $CH_2Ph$), 3.46 (s, 9H, $CH_3O$), 5.26 (m, 2H, Ph), 5.34 (m, 1H, Ph), 5.52 (m, 2H, Ph).

Fixation of [$(C_6H_5Si(OEt)_3)RuCl_2$]$_2$ on silica gel. Silica gel (2.0 g, Strem, median pore diameter: 464 Å, BET surface area: 307 m$^2$/g), [$(C_6H_5Si(OEt)_3)RuCl_2$]$_2$ (0.178 g) and toluene (10 mL) was heated with stirring at 110° C. for 5 h. The mixture was centrifuged and the residue washed consecutively with isopropanol and diethyl ether. The brown solid was dried under vacuum at 110° C. for 4 h to give 2.08 g of powder.

Fixation of [($\eta^6$-$C_6H_5Si(OEt)_3$)Ru(s,s-diphen)Cl on silica gel. [$(C_6H_5Si(OEt)_3)RuCl_2$]$_2$ (150 mg) and s,s-$PhCH(NH_2)CH(NHSO_2C_6H_4CH_3)(Ph)$ (137 mg) were mixed with toluene (10 mL) and triethylamine (0.052 mL). The solution was heated at 80° C. for 30 min to give an orange/red liquid. To the liquid, silica gel (1.535 g) was added and the slurry was stirred at 90° C. for 18 h. The slurry was filtered and the solid was washed with methanol (ca. 30 mL) to remove some of the brown substance. The resulting solid was dried under vacuum for 1 h at 90° C. Yield: 1.52 g. The product is designated as 18 (FIG. 10). Elemental analysis: 4.84 wt % C, 0.79 wt % H, 0.33 wt % N, 0.92 wt % Ru. BET surface area: 256 m$^2$/g, BJH adsorption cumulative pore volume: 1.36 cm$^3$/g, median pore diameter: 402 Å.

EXAMPLE 3
Carbon-Carbon Coupling Reactions Using Organometallic Modified Mesoporous Materials as Catalysts The Pd-TMS12$^c$ materials effectively catalyzed the Heck carbon-carbon coupling reaction of aryl halides (Table 1). The catalytic activity of these materials was investigated using activated and non-activated aryl halides, with n-butyl acrylate as the vinylic substrate. An example reaction is shown in equation (1) between $C_6H_5Br$ and n-butyl acrylate

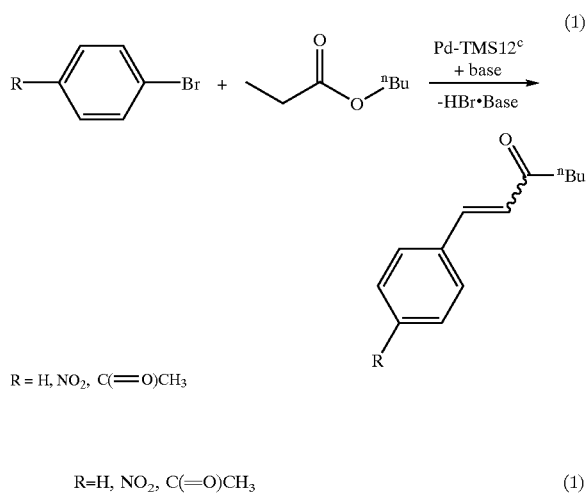

R = H, $NO_2$, C(=O)$CH_3$

R=H, $NO_2$, C(=O)$CH_3$      (1)

The yields for the activated aryl halides, with respect to reaction time and amount of catalyst, showed that the Pd-TMS12$^c$ catalysts have an excellent activity in comparison to the conventional supported Pd catalysts. A TON of 7400 was obtained after 12 h for the reaction of n-butyl acrylate and 4-bromoacetophenone using as little as 0.01 mol% catalyst. A moderate conversion of non-activated aryl halides was noted, and a TON of 500 for bromobenzene has been achieved. Control experiments over commercially available Pd/$Al_2O_3$, Pd/$SiO_2$ and Pd/carbon catalysts (all containing ~10 wt % Pd) were conducted, giving TONs that were ~75% lower than those obtained over Pd-TMS12$^c$ with respect to 1-bromo-4-nitrobenzene (e.g. a TON of 400 was achieved for Pd/$Al_2O_3$). No activity was observed for non-activated aryl substrates over the commercial supported catalysts. The Pd-TMS12$^c$ material is therefore a very efficient heterogeneous Heck catalyst, and rivals some of the best homogeneous Heck catalysts. The reaction between bromobenzene and n-butyl acrylate using homogeneous catalysts showed a TON of 96. In comparison, a TON of 500 was obtained for Pd-TMS12$^c$ at 120° C. after 36 h in the same reaction. To ensure that no reactive palladium was dissolved in the reaction mixture, we isolated the catalyst from the reaction mixture after 20% conversion and monitored the resulting filtrate under identical reaction condition for another 2 h; no further conversion was detectable upon removal of Pd-TMS12$^c$.

TABLE 1

Heck olefination[a] of aryl halides with n-butyl acrylate over Pd-TMS12$^c$ catalysts.

| Aryl Halide Substrate[b] | Amount Of Catalyst (mol %) | Time (h) | % Conversion[c] (% Yield)[d] | E/Z | TON[e] |
|---|---|---|---|---|---|
| $C_6H_5Br$ | 0.05 | 36 | 53 (96) | 95:5 | 500 |
| 4-Br$C_6H_4NO_2$ | 0.05 | 4 | 98 (98) | 96:4 | 1750 |
| 4-Br$C_6H_4NO_2$ | 0.01 | 20 | 72 (96) | 96:4 | 7000 |
| 4-Br$C_6H_4$C(O)$CH_3$ | 0.01 | 12 | 76( 98) | 95:5 | 7400 |

[a]All reactions were carried out under inert gas at 120° C. [b]1.1 equiv. of base [N($CH_2CH_3$)$_3$] with respect to the aryl halide substrate was added to the reaction mixture. [c]Conversion of reactant was determined by gas chromatography. [d]Yield = (mol of coupling product (E + Z)/(mol of reactant converted). [e]TON = (mol of product)/(mol of catalyst).

Figure 11:
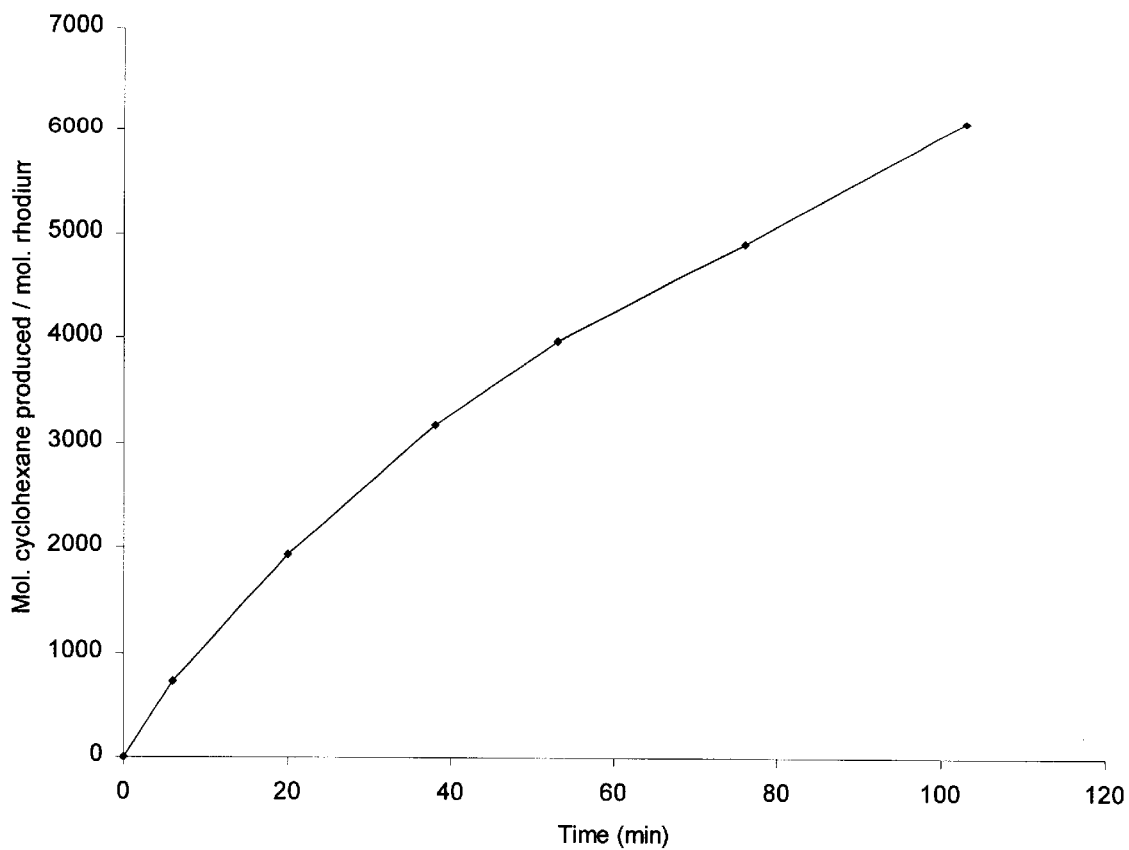
FIG. 11 shows a plot of number of moles cyclohexane produced per mole of rhodium (y-axis) vs. time (x-axis) via hydrogenation of cyclohexene by a rhodium organometallic catalyst immobilized on mesoporous silica foam.

EXAMPLE 4
Hydrogenation Using Organometallic Modified Mesoporous Materials as Catalysts Catalytic Hydrogenation of Cyclohexene by [$SiO_2$][(DPP)$_2$Rh(COD)], 8. cyclohexene (15 g) and [$SiO_2$][(DPP)$_2$ Rh(COD)] (40 mg) were mixed in methanol (250 mL) and the mixture was transferred to an autoclave. The reactor and the mixture were purged with argon for 5 min, then with hydrogen for 2 min. The hydrogen pressure was increased to 60 psi with a stirrer rotating speed of 1000 rpm. The progress of the reaction was monitored by gas chromatography (GC). After 3 h at 25° C., the reaction was stopped and the colorless solution was separated from the yellow catalyst. A TON of ~6000 was achieved as shown in FIG. 11.

Catalytic Hydrogenation of Methyl 2-acetamidoacrylate by [($SiO_2$)OBF$_3$][(DIOP)Rh(COD)], 11b (also see equation 2). Methyl 2-acetamidoacrylate (0.50 g) and [($SiO_2$)OBF$_3$][(DIOP)Rh(COD)] (30 mg) were mixed in hexanes (250 mL) and the mixture was transferred to an autoclave. The reactor and the mixture were purged with argon for 5 min, then with hydrogen for 2 min. The hydrogen pressure was increased to 60 psi with a stirrer rotating speed of 1000 rpm. The progress of the reaction was monitored by chromatography. After 18 h at 25° C., the reaction was stopped and the colorless solution was separated from the orange catalyst. Conversion of the reaction was 100% and the e.e. value of the product was 22%. Results are shown in Table 3.

Catalytic Hydrogenation of Methyl 2-acetamidoacrylate by [($SiO_2$)OBF$_3$][(DHOP)Rh(COD)], 11a. The same conditions as above were used for this reaction. The reaction gives 100% conversion in 18 h with an e.e. value of 22%. Results are shown in Table 3.

Catalytic Hydrogenation of Methyl 2-acetamidoacrylate by [($SiO_2$)$CH_2CH_2CH_2NC$]Ru(S-BINAP)$Cl_2$, 13. Methyl 2-acetamidoacrylate (0.50 g) and [(SiO$_2$)CH$_2$CH$_2$CH$_2$NC]Ru(S-BINAP)Cl$_2$ (30 mg) were mixed in hexane (250 mL) and the mixture was transferred to an autoclave. The reactor and the mixture were purged with argon for 5 min, then with hydrogen for 2 min. The hydrogen pressure was increased to 140 psi with a stirrer rotating speed of 1000 rpm. The progress of the reaction was monitored by chromatography. After 66 h at 25° C., the reaction was stopped. Conversion of the reaction by GC was 100% and the e.e. value of the product was 22%. Results are shown in Table 3.

Figure 12:
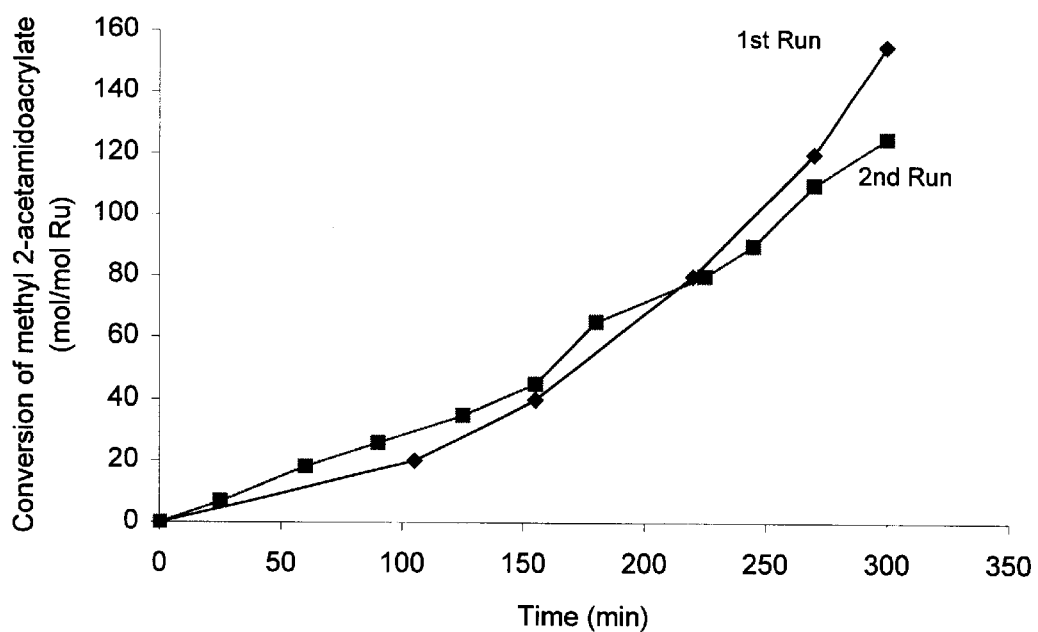
FIG. 12 shows a plot of conversion of methyl-2-acetamidoacrylate (y-axis) vs. time (x-axis) via hydrogenation with an immobilized organometallic catalyst, demonstrating that immobilized organometallic catalysts of the present invention can be reused without significant loss of activity or selectivity.
Figure 13:
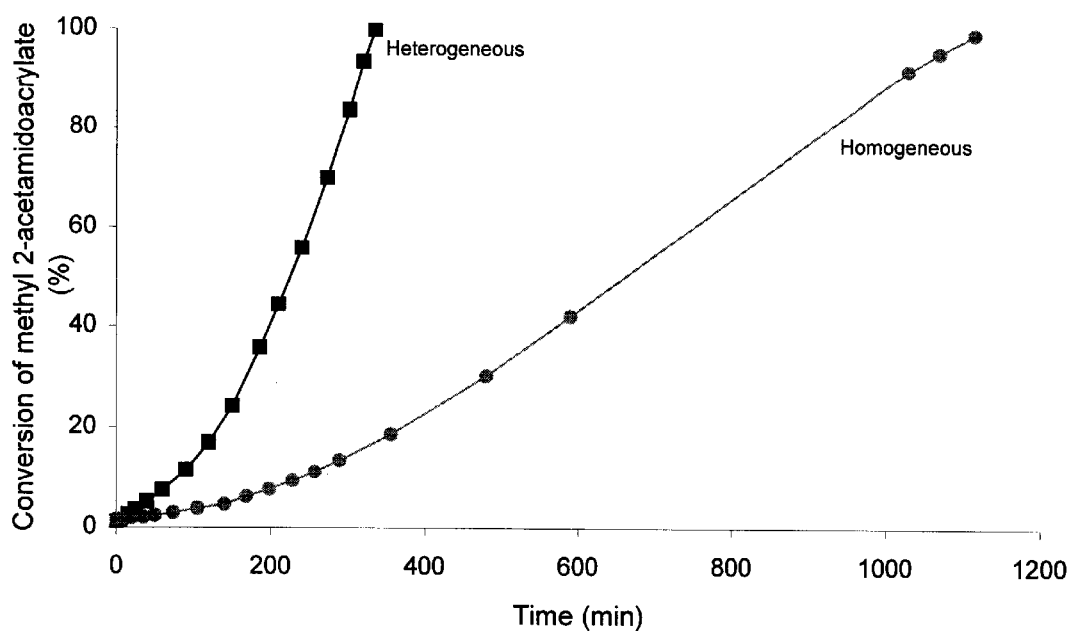
FIG. 13 shows a plot comparing conversion of methyl-2-acetamidoacrylate (y-axis) vs. time (x-axis) between the immobilized organometallic catalyst vs. the homogenous catalyst.

Catalytic Hydrogenation of Methyl 2-acetamidoacrylate by [(S-BINAP)Ru(C$_8$H$_{11}$)(CNC$_3$H$_6$(SiO$_2$)]BF$_4$, 15. Methyl 2-acetamidoacrylate (250 mg) was dissolved in methanol (250 mL) and the solution was transferred to an autoclave. The reactor and the mixture were purged with argon for 5 min, then with hydrogen for 2 min. The hydrogen pressure was increased to 150 psi with a stirrer speed of 1000 rpm. The increase in H$_2$ pressure was used to blow in 20 mg of the catalyst ([(S-BINAP)Ru(C$_8$H$_1$)(CNC$_3$H$_6$(SiO$_2$)]BF$_4$) from a holding tube. The progress of the reaction was monitored by chromatography. The reaction reached completion after ~4 h at 60° C. and the e.e. value of the product was ~65%. Following the reaction, the reaction mixture was removed and centrifuged under argon to recover the catalyst powder. The yellow powder was then rinsed with methanol, centrifuged, and recovered (all under argon) before being reused. The second reaction run was performed under identical conditions except the mass of all reactants used was halved. The results of the two sequential hydrogenations with the same catalyst are shown in FIG. 12 and demonstrate that the immobilized organometallic catalysts can be reused without significant loss of activity or selectivity (first run: e.e.=65%; second run: e.e.=61%). Photoacoustic infrared spectra (FIG. 9) of the mesoporous material were taken before the immobilization of the Ru complex (FIG. 9(b)), after the immobilization of the Ru complex (FIG. 9(c)), and after the reactions and rinsing with methanol (FIG. 9(d)). An infrared spectrum of the homogeneous catalyst (FIG. 9(a)) is included for comparison. The isonitrile vibration at ~2100 cm$^{-1}$ and the naphthal vibrations from BINAP at ~700 cm$^{-1}$ are still present after the reactions, indicating that the catalyst remains immobilized on the silica surface. The homogenous complex [(S-BINAP)Ru(C$_8$H$_{11}$)(CNC$_3$H$_6$Si(OCH$_2$CH$_3$)$_3$]BF$_4$ was also run under identical conditions, except the total mass of catalyst used was 8 mg, to provide a comparison between the activities of the heterogeneous and homogeneous catalysts. The conversion of methyl(α-acetylamino) acrylate versus time for the runs catalyzed by both the homogeneous and heterogeneous compounds are shown in FIG. 13. From these results it is evident that the heterogeneous catalyst maintained the same selectivity as the homogeneous complex (e.e.=65% (S) in both cases)., and that the heterogeneous catalyst was actually more active than its homogeneous counterpart.

Hydrogenation of terminal olefins by silica supported catalyst. Methyl 2-acetamidoacrylate (247 mg), 15 (100 mg), and methanol (5 mL) were mixed in a 3-oz pressure reactor under argon. The reactor was charged with 55 psi H$_2$ and heated with stirring in 60° C. oil bath for 24 hours. The hydrogen pressure dropped to 50 psi. Next, the pressure was released and the solution was transferred to a centrifuge tube under argon. After centrifugation, the liquid portion was separated and analyzed by gas chromatography, and the solid was washed with methanol three times and reused for a second reaction run. Analytical conditions: column: β-DM (30 m×0.32 mm) from Advance Separation Technologies, Inc.; oven temperature: 110° C.; carrier gas: 25 psi helium; GC detector: FID. Other olefinic substrates were hydrogenated in a similar fashion. The results are listed in Table 2.

TABLE 2

Hydrogenation of olefins by silica supported catalyst 15.[a]

| Entry | Substrate | Reaction Time (h) | % e.e. | % Conversion |
| --- | --- | --- | --- | --- |
| 1 | H$_3$C-C(O)-NH-C(=CH$_2$)-C(O)-OCH$_3$ | 24 | 71 | 100 |
| 2 (recycled catalyst, second run) | same as above | 24 | 74 | 100 |
| 3 (third run) | same as above | 24 | 75 | 98 |
| 4 | α-methylene-γ-butyrolactone | 4 | 64 | 100 |
| 5 | α-methylene-γ-butyrolactone | 15 | 78.6 | 75.8 |

TABLE 2-continued

Hydrogenation of olefins by silica supported catalyst 15.[a]

| Entry | Substrate | Reaction Time (h) | % e.e. | % Conversion |
|---|---|---|---|---|
| 6 | H₃CO-naphthalene-C(=CH₂)COOH | 15 | 0 | 100 |
| 7 | H₃CO-naphthalene-C(=CH₂)COOCH₃ | 15 | 0 | 100 |

[a]Reactions were carried out at 60° C. and 55 psi $H_2$ pressure in methanol. The e.e. values were determined by gas chromatography using a β-DM or γ-TA column from Advanced Separation Technologies, Inc.

Figure 14:
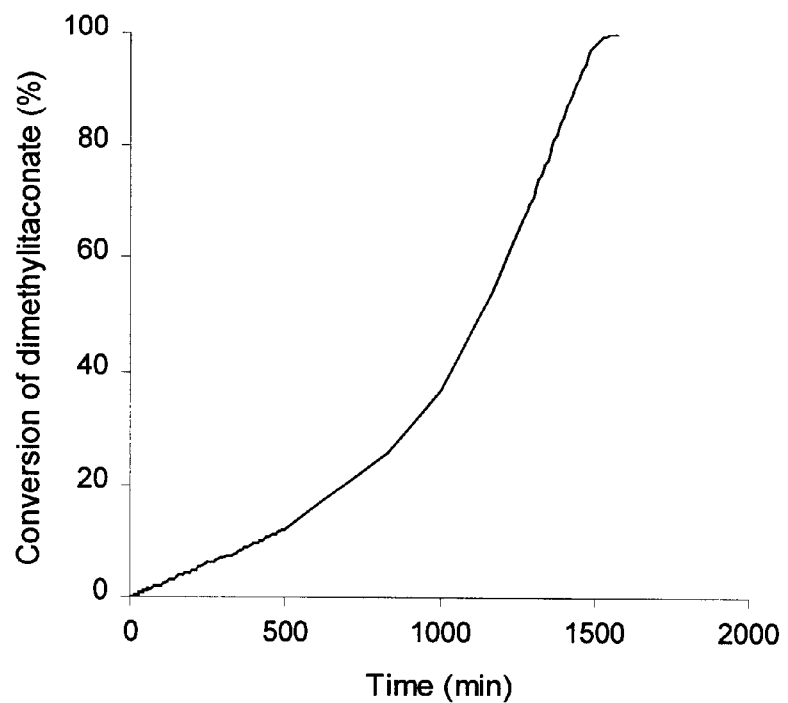
FIG. 14 shows a plot of conversion of dimethylitaconate (y-axis) vs. time (x-axis) via hydrogenation with an immobilized organometallic catalyst.

Catalytic Hydrogenation of Dimethylitaconate by [(S-BINAP)Ru($C_8H_{11}$)(CN$C_3H_6$(Si$O_2$))]B$F_4$, 15. Dimethylitaconate (20 g) was dissolved in methanol (250 mL) and the solution was transferred to an autoclave. The reactor and the solution were purged with argon for 5 min, then with hydrogen for 2 min. The hydrogen pressure was increased to 150 psi and the stirrer speed was set to 1000 rpm. The increase in $H_2$ pressure was used to blow in 20 mg of the catalyst ([(S-BINAP)Ru($C_8H_{11}$)(CN$C_3H_6$(Si$O_2$))]B$F_4$) from a holding tube. The progress of the reaction was monitored by an in situ infrared probe and the e.e. value of the product was determined by chromatography. The reaction reached completion after ~24 h at 60° C. and the e.e. value of the product was ~60%. The dimethylitaconate conversion profile versus time as determined by continuous IR monitoring is shown in FIG. 14.

Figure 15:
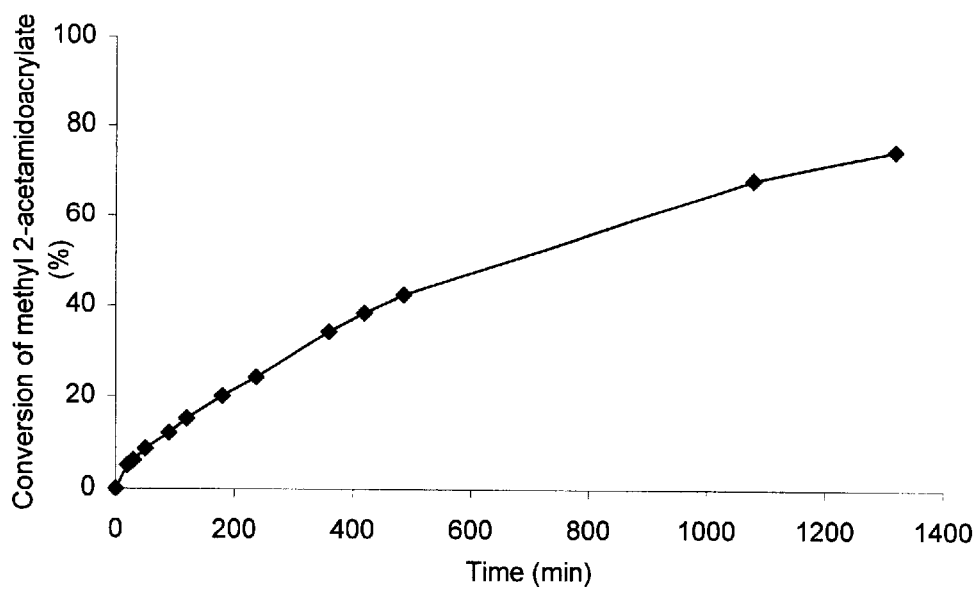
FIG. 15 shows a plot of conversion of methyl-2 acetamidoacrylate (y-axis) vs. time via hydrogenation with an immobilized organometallic catalyst.

Catalytic Hydrogenation of Methyl 2-acetamidoacrylate by [(S-BINAP)Ru($C_8H_{11}$)(HS$C_2H_4$(Si$O_2$))]B$F_4$. Methyl 2-acetamidoacrylate (250 mg) was dissolved in methanol (250 mL) and the solution was transferred to an autoclave. The reactor and the solution were purged with argon for 5 min, then with hydrogen for 2 min. The hydrogen pressure was increased to 150 psi and the stirrer speed was adjusted to 1000 rpm. The increase in $H_2$ pressure was used to blow in 20 mg of the catalyst ([(S-BINAP)Ru($C_8H_{11}$)(HS$C_2H_4$(Si$O_2$))]B$F_4$) from a holding tube. The progress of the reaction was monitored by chromatography. The reaction reached 75% convertion after ~24 h at 60° C. and the e.e. value of the product was ~65%. The conversion of methyl 2-acetamidoacrylate is plotted against time in FIG. 15. The thiol immobilized catalyst was less active than the isonitrile immobilized catalyst, compound 15 (FIG. 12), however both heterogeneous catalysts gave the same selectivity (e.e.= 65%).

Hydrogenation of acetophenone by heterogenized catalyst 18, sodium tert-butoxide as base. 18 (0.50 g) was mixed with isopropanol (50 mL) and sodium tert-butoxide (0.012 g). To the stirring solution, acetophenone (0.6 g) was added and the reaction was monitored by gas chromatography. After 55 hours at 25° C., it reached 90% conversion with 82% e.e.

Hydrogenation of acetophenone by heterogenized catalyst 18, potassium hydroxide as a base. 18 (0.21 g) was mixed with potassium hydroxide (0.029 g) and isopropanol. Acetophenone (0.25 g) was added to the mixture, which was stirred at room temperature. The reaction was monitored by gas chromatography. After 23 h and 18 min, the conversion of acetophenone reached 60.9% with 86.8% e.e. After the reaction had proceeded for 3 h and 45 min, about 3 mL of the reaction solution was filtered through a Celite pad. The clear filtrate was found to have 20.9% acetophenol (83% e.e.). The filtrate was stirred at room temperature for 7 h and 25 min. GC analysis revealed 23% conversion with 83% e.e. Therefore, amount of the catalytically active species in the solution phase was minimal.

Catalytic Hydrogenation of Methyl 2-acetylamidoacrylate by [(Si$O_2$)OB$F_3$][(DIOP)Rh(COD)], 11b. Methyl 2-acetylamidoacrylate (0.50 g) and [(Si$O_2$)OB$F_3$][(DIOP)Rh(COD)] (30 mg) was mixed in hexanes (250 mL) and the mixture was transferred to an autoclave. The reactor and the mixture were purged with argon for 5 min then with hydrogen for 2 min. The hydrogen pressure was increase to 60 psi with stirrer rotating speed of 1000 rpm. The progress of the reaction was monitored by a column chromatography. After 18 h, the reaction is stopped and the colorless solution was separated from the orange catalyst. Conversion of the reaction by GC was 100% and the e.e. value of the product is 22%.

Catalytic Hydrogenation of Methyl 2-acctylamidoacrylate By [(Si$O_2$)OB$F_3$][(DHOP)Rh(COD)], 11a. Same conditions as above were used. The reaction gives 100% conversion in 18 h with e.e. of the product being: 22%.

Catalytic Hydrogenation of Methyl 2-acetylamidoacrylate By [(Si$O_2$)C$H_2$C$H_2$C$H_2$NC]Ru(S-BINAP)Cl, 13. Methyl(α-acetylamino) acrylate (0.50 g) and [(Si$O_2$)C$H_2$C$H_2$C$H_2$NC]Ru(S-BINAP)Cl (30 mg) was mixed in hexanes (250 mL) and the mixture was transferred to an autoclave. The reactor and the mixture were purged with argon for 5 min then with hydrogen for 2 min. The hydrogen pressure was increase to 140 psi with stirrer rotating speed of 1000 rpm. The progress of the reaction was monitored by a column chromatography. After 66 h, the reaction is stopped. Conversion of the reaction by GC was 100% and the e.e. of 22%.

TABLE 3

Asymmetric hydrogenation* of methyl(α-acylamino)acrylate

| entry | Catalyst | Solvent | Time (h) | H₂ pressure (psi) | Conversion (%) | ee % |
|---|---|---|---|---|---|---|
| 1 | 11b | Hexanes | 18 | 60 | 100 | 22 |
| 2 | 11a | Hexanes | 18 | 60 | 100 | 22 |
| 3 | 13 | Methanol | 66 | 140 | 100 | 22 |

*All reactions were carried out at room temperature and catalyst and substrate ration is 1:166 (weight).

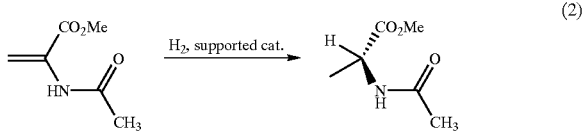

(2)

Those skilled in the art would readily appreciate that all parameters listed herein are meant to be examples and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed:

1. An article comprising an organometallic catalyst immobilized on a polymer-templated mesoporous composition comprising a ceramic having at least about 50% of a total pore volume comprising pores with a mean diameter of at least about 50 Å.

2. The article of claim 1, wherein at least about 60% of the total pore volume comprises pores with a mean diameter of at least about 50 Å.

3. The article of claim 1, wherein at least about 70% of the total pore volume comprises pores with a mean diameter of at least about 50 Å.

4. The article of claim 1, wherein at least about 80% of the total pore volume comprises pores with a mean diameter of at least about 50 Å.

5. The article of claim 1, wherein at least about 50% of the total pore volume comprises pores with a mean diameter of at least about 60 Å.

6. The article of claim 1, wherein substantially all of the pores have a mean diameter of no more than about 1 μm.

7. The article of claim 1, wherein the mesoporous composition has a total pore volume of at least about 0.6 cm³/g.

8. The article of claim 1, wherein the organometallic catalyst comprises a metal selected from the group consisting of transition metals and lanthanides.

9. The article of claim 8, wherein the transition metal is selected from the group consisting of ruthenium, rhodium, iridium, palladium, platinum, iron, osmium, cobalt, molybdenum, tungsten, nickel, copper, gold, silver, zirconium, titanium and hafnium.

10. The article of claim 9, wherein the transition metal is selected from the group consisting of ruthenium, rhodium, iridium, palladium and platinum.

11. The article of claim 1, wherein the mesoporous composition has a surface area of at least about 500 m²/g.

12. The article of claim 1, wherein the mesoporous composition is selected from the group consisting of carbides, silicides, nitrides and oxides.

13. The article of claim 12, wherein the mesoporous composition comprises an oxide.

14. The article of claim 13, wherein the mesoporous composition comprises a silicate.

15. The article of claim 14, wherein the mesoporous composition is SBA-15.

16. The article of claim 14, wherein the mesoporous composition is MCF.

17. The article of claim 1, wherein the mesoporous composition comprises a dopant metal ion.

18. The article of claim 17, wherein the dopant metal ion is selected from the group consisting of aluminum, boron, niobium, tantalum, titanium and zirconium.

19. The article of claim 1, wherein the catalyst is a hydrogenation catalyst.

20. The article of claim 1, wherein the catalyst is a carbon-carbon coupling catalyst.

21. The article of claim 1, wherein the catalyst is a carbonylation catalyst.

22. The article of claim 1, wherein the catalyst is a hydroformylation catalyst.

23. The article of claim 1, wherein the organometallic catalyst is covalently immobilized on the mesoporous composition.

24. The article of claim 23, wherein the catalyst is covalently immobilized on the mesoporous composition via a ligand of the organometallic catalyst.

25. The article of claim 24, wherein the ligand is selected from the group consisting of an amine, a phosphine, an amide, an imine, an amido, a thiol, a thiolate, an alkyl, an aryl, an arene, a cyclopentadienyl, an alkoxide, a phosphide, a phosphate, a nitrile, an isonitrile and a sulfonate ligand.

26. The article of claim 1, wherein the catalyst is an asymmetric catalyst.

27. The article of claim 26, wherein the asymmetric catalyst is an asymmetric hydrogenation catalyst.

28. The article of claim 26, wherein the asymmetric catalyst is immobilized on the mesoporous composition via an achiral ligand.

29. The article of claim 28, wherein the achiral ligand is selected from the group consisting of an amine, a phosphine, an amide, an imine, an amido, a thiol, a thiolate, an alkyl, an aryl, an arene, a cyclopentadienyl, an alkoxide, a phosphide, a phosphite, a nitrile, an isonitrile and a sulfonate ligand.

30. The article of claim 1, wherein the organometallic complex is ionically immobilized on the mesoporous composition.

31. The article of claim 30, wherein the organometallic complex is cationically immobilized on the mesoporous composition.

32. The article of claim 30, wherein the organometallic complex is anionically immobilized on the mesoporous composition.

33. An article comprising a polymerization catalyst immobilized on a mesoporous composition comprising a ceramic, the composition having pores of a predetermined mean diameter to define a molecular weight distribution of a polymer.

34. A method for making a catalyst, comprising:
    immobilizing an organometallic catalyst on a polymer-templated mesoporous composition comprising a ceramic, the mesoporous composition having at least about 50% of a total pore volume comprising pores with a mean diameter of at least about 50 Å.

35. An article comprising:
    an asymmetric-organometallic catalyst immobilized on a surface via an achiral ligand.

36. The article of claim 35, wherein the surface comprises a mesoporous composition comprising a ceramic.

37. The article of claim 36, wherein the mesoporous composition has at least about 50% of its total pore volume comprising pores with a mean diameter of at least about 50 Å.

38. The article of claim 35, wherein the achiral ligand is selected from the group consisting of an amine, a phosphine, an amide, an imine, an amido, a thiol, a thiolate, an alkyl, an aryl, an arene, a cyclopentadienyl, an alkoxide, a phosphide, a phosphite, a nitrile, an isonitrile and a sulfonate ligand.

39. The article of claim 35, wherein the catalyst is covalently immobilized on the surface.

40. The article of claim 35, wherein the catalyst is ionically immobilized on the surface.

41. The article of claim 35, wherein the asymmetric catalyst is a hydrogenation catalyst.

42. The method of claim 34, wherein the step of immobilizing comprises ionically immobilizing the organometallic catalyst on the mesoporous composition.

43. The method of claim 34, wherein the step of immobilizing comprises covalently immobilizing the organometallic catalyst on the mesoporous composition.

44. The method of claim 43, wherein the step of immobilizing comprises:

providing a ligand having a first site capable of bonding to a metal and a second site reactive with the mesoporous composition; and immobilizing the ligand to the mesoporous composition via the second site.

45. The method of claim 44, wherein the step of immobilizing further comprises bonding a metal to the ligand via the first site.

46. The method of claim 43, wherein the step of immobilizing comprises:

providing the organometallic catalyst having a ligand reactive with the mesoporous composition; and immobilizing the organometallic catalyst on the mesoporous composition via the reactive ligand.

* * * * *